US007718973B2

(12) United States Patent
Endo et al.

(10) Patent No.: US 7,718,973 B2
(45) Date of Patent: May 18, 2010

(54) RADIATION IMAGING APPARATUS AND RADIATION IMAGING SYSTEM

(75) Inventors: Tadao Endo, Honjo (JP); Toshio Kameshima, Kumagaya (JP); Tomoyuki Yagi, Honjo (JP); Katsuro Takenaka, Kodama-gun (JP); Keigo Yokoyama, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/683,145

(22) Filed: Mar. 7, 2007

(65) Prior Publication Data
US 2007/0210258 A1 Sep. 13, 2007

(30) Foreign Application Priority Data
Mar. 10, 2006 (JP) ............................. 2006-066089
Jan. 17, 2007 (JP) ............................. 2007-008140

(51) Int. Cl.
G01T 1/24 (2006.01)
(52) U.S. Cl. ................................................. 250/370.08
(58) Field of Classification Search ............. 250/370.08
See application file for complete search history.

(56) References Cited

U.S. PATENT DOCUMENTS

| 6,734,414 | B2 | 5/2004 | Street | 250/208.1 |
|---|---|---|---|---|
| 6,952,015 | B2 | 10/2005 | Kameshima | 250/370.11 |
| 6,952,464 | B2 | 10/2005 | Endo | 378/98.11 |
| 6,985,555 | B2 | 1/2006 | Endo | 378/98.11 |
| 7,002,157 | B2 | 2/2006 | Kameshima | 250/370.11 |
| 7,012,260 | B2 | 3/2006 | Endo | 250/370.11 |
| 7,138,639 | B2 | 11/2006 | Kameshima | 250/370.11 |
| 7,154,099 | B2 | 12/2006 | Endo | 250/370.11 |
| 7,227,926 | B2 | 6/2007 | Kameshima et al. | 378/98.9 |
| 2002/0140830 | A1* | 10/2002 | Shirakawa et al. | 348/245 |
| 2003/0190088 | A1 | 10/2003 | Kobayashi | 382/275 |
| 2005/0109927 | A1 | 5/2005 | Takenaka et al. | 250/252.1 |
| 2005/0151059 | A1* | 7/2005 | Nakajima et al. | 250/208.1 |
| 2005/0199834 | A1 | 9/2005 | Takenaka et al. | 250/580 |
| 2005/0200720 | A1 | 9/2005 | Kameshima et al. | 348/220.1 |
| 2005/0220269 | A1 | 10/2005 | Endo et al. | 378/114 |
| 2005/0264665 | A1 | 12/2005 | Endo et al. | 348/308 |
| 2006/0098107 | A1* | 5/2006 | Lee et al. | 348/241 |

(Continued)

FOREIGN PATENT DOCUMENTS

JP 2004-7551 1/2004

*Primary Examiner*—David P Porta
*Assistant Examiner*—Carolyn Igyarto
(74) *Attorney, Agent, or Firm*—Fitzpatrick, Cella, Harper & Scinto

(57) ABSTRACT

A radiation imaging apparatus comprises a read unit reading electric signals from radiation detecting elements that are arranged two-dimensionally and that convert incident radiation into electric signals. A control unit controls the radiation detecting unit such that a first radiation detecting element is switched into a state in which charge generated therein cannot be taken out (a "senseless state") and a second radiation detecting element is switched into a state in which it charge generated therein by incident radiation can be taken out (a "sensible state"), and a signal processing unit performs a subtraction processing such that the electric signal from the radiation detecting element that is in the senseless state is subtracted from the electric signal from the radiation detecting element that is in the sensible state, to reduce conspicuous line noise in an image by means of a relatively simple configuration.

13 Claims, 23 Drawing Sheets

U.S. PATENT DOCUMENTS

| | | | |
|---|---|---|---|
| 2006/0119719 A1 | 6/2006 | Kameshima | 348/308 |
| 2006/0192130 A1 | 8/2006 | Yagi | 250/370.14 |
| 2006/0289774 A1 | 12/2006 | Endo et al. | 250/370.09 |
| 2007/0040099 A1 | 2/2007 | Yokoyama et al. | 250/208.1 |
| 2007/0069144 A1 | 3/2007 | Kameshima | 250/370.09 |
| 2007/0080299 A1 | 4/2007 | Endo et al. | 250/370.09 |
| 2007/0096032 A1 | 5/2007 | Yagi et al. | 250/370.11 |
| 2007/0125952 A1 | 6/2007 | Endo et al. | 250/369 |
| 2007/0131843 A1 | 6/2007 | Yokoyama et al. | 250/205 |
| 2007/0183573 A1 | 8/2007 | Kameshima et al. | 378/98.9 |
| 2007/0210258 A1 | 9/2007 | Endo et al. | 250/370.09 |

* cited by examiner

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system suitably applicable to medical diagnosis and industrial non-destructive inspection. In the description of the specification, a radiation includes electromagnetic waves such as X- and gamma rays and alpha and beta rays.

2. Description of the Related Art

Nowadays, X-ray imaging in a hospital has been changing from a conventional analog system using films to a digital system. Digitized X-ray imaging easily solves problems which have been pointed out so far such as the safekeeping of films, the management of developers, radiographing time period and burden to patients at the time of failure in radiographing and enables providing a new medial environment to meet the needs of the times.

A CR (computed radiography) system using photostimulable phosphor called an imaging plate (IP) as a digital X-ray imaging system has dominated since 1980s and has had a share in digitization. The CR system has indeed an aspect of digitization, but it requires two-step process in which a latent X-ray image in the IP by X-ray imaging is scanned by laser beams to obtain images. For this reason, the CR system has still a problem with work flow in that time is needed from radiographing to acquiring images.

A digital X-ray imaging apparatus provided with radiographing detecting elements containing as a main ingredient amorphous silicon and amorphous selenium have been practically used in recent years. The former is of indirect type in which X-ray images are converted into visible images by a phosphor containing as a main ingredient CsI:Tl or $Gd_2O_2S$:Tb and the visible images are converted into electric signals by X-ray detecting elements containing as a main ingredient amorphous silicon. On the other hand, the latter is of direct type in which X-rays are directly converted into electric signals by X-ray detecting elements containing as a main ingredient amorphous selenium. Both are capable of realizing a wider and thin X-ray imaging apparatus, so that it is also referred to as "flat panel detector (FPD)" and characterized in that the time required from imaging to observing images is very short. In a recent digital system, a demand for the CR system is still active, but a demand for the FPD system is gradually developing.

In the next place, a moving image radiographing (fluoroscopic radiography) is briefly described below. In fluoroscopic radiography for gastric as an example of the moving image radiographing, the inner wall of a stomach or duodenum with barium swallowed as a contrast medium is observed by an imaging apparatus called an image intensifier (II). The II is very sensitive and a device widely used for moving image radiographing. The II converts an X-ray image into a visual image and then converges the visual image using an electronic lens, which offers a drawback in that an apparatus becomes bulky and heavy and peripheral images are greatly distorted. In addition, it is pointed out that the II is so small in dynamic range that a problem with halation is caused. Furthermore, the II remarkably deteriorates in its characteristics and is short in lifetime, so that it needs to be replaced every three to five years depending on frequency in use. In a fluoroscopic radiographing for gastric, when a still image is photographed by fluoroscoping by the II with a film loaded.

The II is also used for fluoroscopic radiographing of heart or brain as well as for a fluoroscopic inspection of gastric. Since the moving image radiographing exposes a patient to X rays for a long time, it is necessary to reduce the dose of X rays per unit time in radiographing. For this reason, an X-ray imaging apparatus needs to be higher in sensitivity than that used for the still image radiographing.

An FPD capable of both photographing a still image and radiographing a moving image has been proposed in recent years. Radiographing a moving image needs to ensure a high frame rate unlike photographing a still image. In general, cardioangiography requires a frame rate of 30 FPS depending on the part and the purpose of radiographing, so that S/N is improved by using, for example, a pixel binding method to further increase the frame rate.

The FPD can generate such turbulence in a signal that a certain noise quantity is superimposed on a line basis. This is referred to as "line noise" and brings about a horizontal (in the direction of a line) linear artifact illustrated in FIG. 23 to significantly decrease image quality.

The line noise is most probably attributed to the following reason; a generated noise gets into a driving signal output from a driving circuit because switching elements are collectively operated on a line basis or into a signal wiring for some reason, and thereafter is transferred at the same time. The line noise is liable to be generated also at the time of resetting the capacitors of the signal wiring and the capacitive elements in a reading circuit because the resetting is performed on a line basis. The line noise can get into a signal from the driving circuit and various power supplies (including GND) or it generates in an adjacent appliance and gets into a signal through space. The line noise getting into at the time of establishing a proper electric potential, for example, immediately before the transfer of signal electric charges is finished or resetting is finished is turned into a line noise on a line basis.

In general, a random noise is known as one of noises resulting from the graininess of an image. The noise is generated by a shot noise resulting from the dark current of a sensor (a radiation detecting element), a thermal noise of a switching element, a thermal noise generated in the resistance of a drive wiring or a signal wiring and thermal noise from the operational amplifier in a reading circuit. The line noise significantly degrades image quality if the image is formed on a line basis as illustrated in FIG. 23. If the line noise is generated not singularly, as illustrated in FIG. 23, but randomly also on a line basis, the relationship between the standard deviation $\sigma(R)$ of the random noise and the standard deviation $\sigma(L)$ of the line noise can be experientially $\sigma(L)=\sigma(R)\cdot\frac{1}{10}$ or less. That is to say, the line noise is extremely conspicuous on an image and is very difficult to reduce. Particularly in the moving image radiographing, a little dose of X rays produces a problem in that the line noise is liable to be conspicuous. For example, the following is cited as document on conventional art related to line noise on an imaging apparatus. Japanese Patent Application Laid-Open No. 2004-007551 discloses an imaging apparatus which is provided with a line noise detecting unit for detecting the existence of a line noise in the imaging output of a two-dimensional area sensor stored in a memory circuit and calculates the output quantity of the line noise to remove the line noise from the imaging output. Furthermore, U.S. Pat. No. 6,734,414 discloses an imaging apparatus in which drive wirings are not connected to pixels on a line basis, but randomly connected to prevent a horizontal linear line noise from being generated as illustrated in FIG. 20.

SUMMARY OF THE INVENTION

In Japanese Patent Application Laid-Open No. 2004-007551, the output of the line noise is calculated from an average of line output. However, particularly in the X-ray imaging apparatus with an area of as large as 40 cm×40 cm, the line noises generated on a line basis probably have shading and show an inappropriate correction value as a line noise quantity to be corrected. Using a calculation method taking the above into consideration causes a problem that a real-time correction is difficult if it takes a long time to perform calculation. In addition, a complicated algorithm increases a burden to apparatus development and a cost.

In U.S. Pat. No. 6,734,414, since the drive wiring is randomly connected, output signals are irregular and the output signals need to be rearranged at a processing circuit of a rear stage, consuming more time for processing the output signals and leading to increase in the cost of apparatus configuration. Furthermore, the connection of the drive wirings is complicated, which may lower production yield to increase production cost.

That is to say, it has been difficult for the conventional art to realize reducing an extremely conspicuous line noise generated on an image without a substantial increase in cost and with a relatively simple configuration. Especially in a moving image radiographing (fluoroscopy) mode with a little dose of X ray quantity, it has been very difficult to reduce the line noise with a relatively simple configuration.

The present invention has been made in view of the problems and has its purpose to provide a radiation imaging apparatus and a radiation imaging system which realize reducing an extremely conspicuous line noise generated on an image with a relatively simple configuration.

The radiation imaging apparatus according to the present invention includes a radiation detecting unit in which pixels including the radiation detecting elements converting incident radiation into electric charges are arranged two-dimensionally, a control unit performing such a state control that a first pixel in the radiation detecting unit is made senseless state so that an electric charge generated in a first radiation detecting element according to incident radiation cannot be taken out of the first pixel and a second pixel different from the first pixel is made sensible state so that an electric charge generated in a second radiation detecting element according to incident radiation can be taken out of the second pixel group and a signal processing unit performing a subtraction processing such that the electric signal read out from the second pixel made senseless state is subtracted from the electric signal read from the first pixel made sensible state according to the state control by the control unit. The radiation imaging system according to the present invention is provided with the radiation imaging apparatus and a radiation source which radiates the radiation imaging apparatus with radiation.

According to the present invention, an extremely conspicuous line noise generated on an image can be reduced with a relatively simple configuration. Furthermore, according to the present invention, particularly in the moving image radiographing, reading the addition of the pixel signals increases a frame rate and signal quantity thereof, enabling generating a high-speed moving image which is low in line noise. In addition, only a single radiation imaging apparatus enables both still and moving image radiographing. The present invention achieves an effect that reduces the line noise without increasing cost.

Further features of the present invention will become apparent from the following description of exemplary embodiments with reference to the attached drawings.

DESCRIPTION OF THE EMBODIMENTS

An exemplary embodiment to which the present invention is applied is described in detail below with reference to the drawings. In the present embodiment, an example in which X rays are used as a radiation is described, however the present invention does not limit the radiation to the X rays, but may include the other radiations such as, for example, alpha, beta and gamma rays.

First Embodiment

Figure 1:
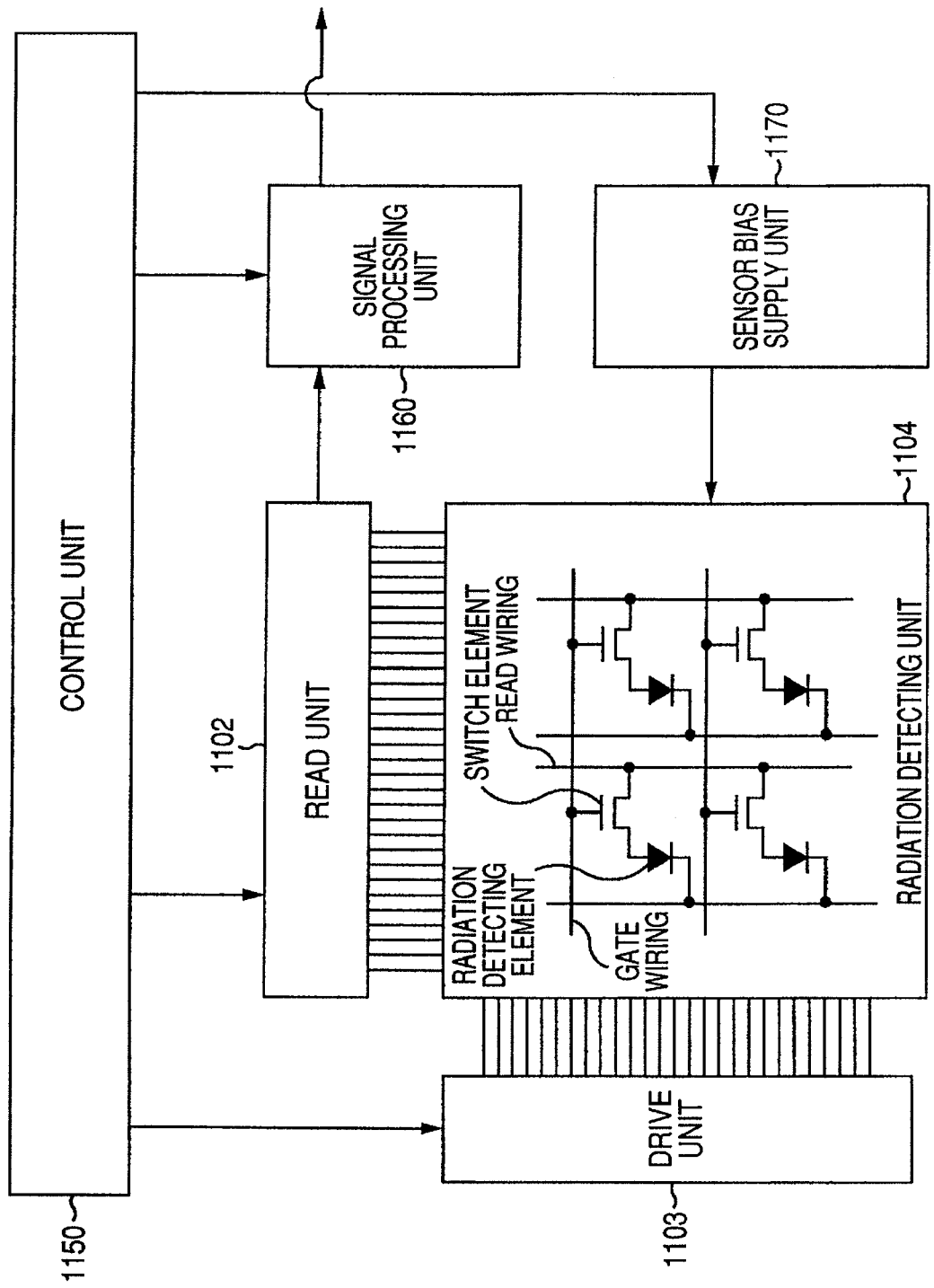
FIG. 1 is a schematic block diagram of a radiation imaging apparatus according to a first embodiment.

FIG. 1 is a schematic block diagram of a radiation imaging apparatus according to a first embodiment.

The radiation imaging apparatus according to the first embodiment includes a read unit 1102, drive unit 1103, radiation detecting unit 1104, control unit 1150, signal processing unit 1160 and sensor bias supply unit (voltage supply unit) 1170.

The radiation detecting unit 1104 includes radiation detecting elements, switch elements, drive wirings and signal wirings and detects incident radiations such as X rays to convert them into signal charges. The drive unit 1103 drives the switch elements of the radiation detecting unit 1104 when electric signals based on signal charges in the radiation detecting elements of the radiation detecting unit 1104 are read. The read unit 1102 reads the electric signals based on the signal charges in the radiation detecting elements of the radiation detecting unit 1104.

The signal processing unit 1160 provides various processes for the electric signals read by the read unit 1102 to generate image data. While a signal processing unit includes the read unit 1102 and the signal processing unit 1160 in the present invention, the signal processing unit may include other circuit elements such as, for example, a memory. The sensor bias supply unit 1170 supplies the radiation detecting elements of the radiation detecting unit 1104 with sensor bias. The control unit 1150 controls the read unit 1102, drive unit 1103, radiation detecting unit 1104, signal processing unit 1160 and sensor bias supply unit 1170 to totally control the operation of the radiation imaging apparatus.

Figure 2:
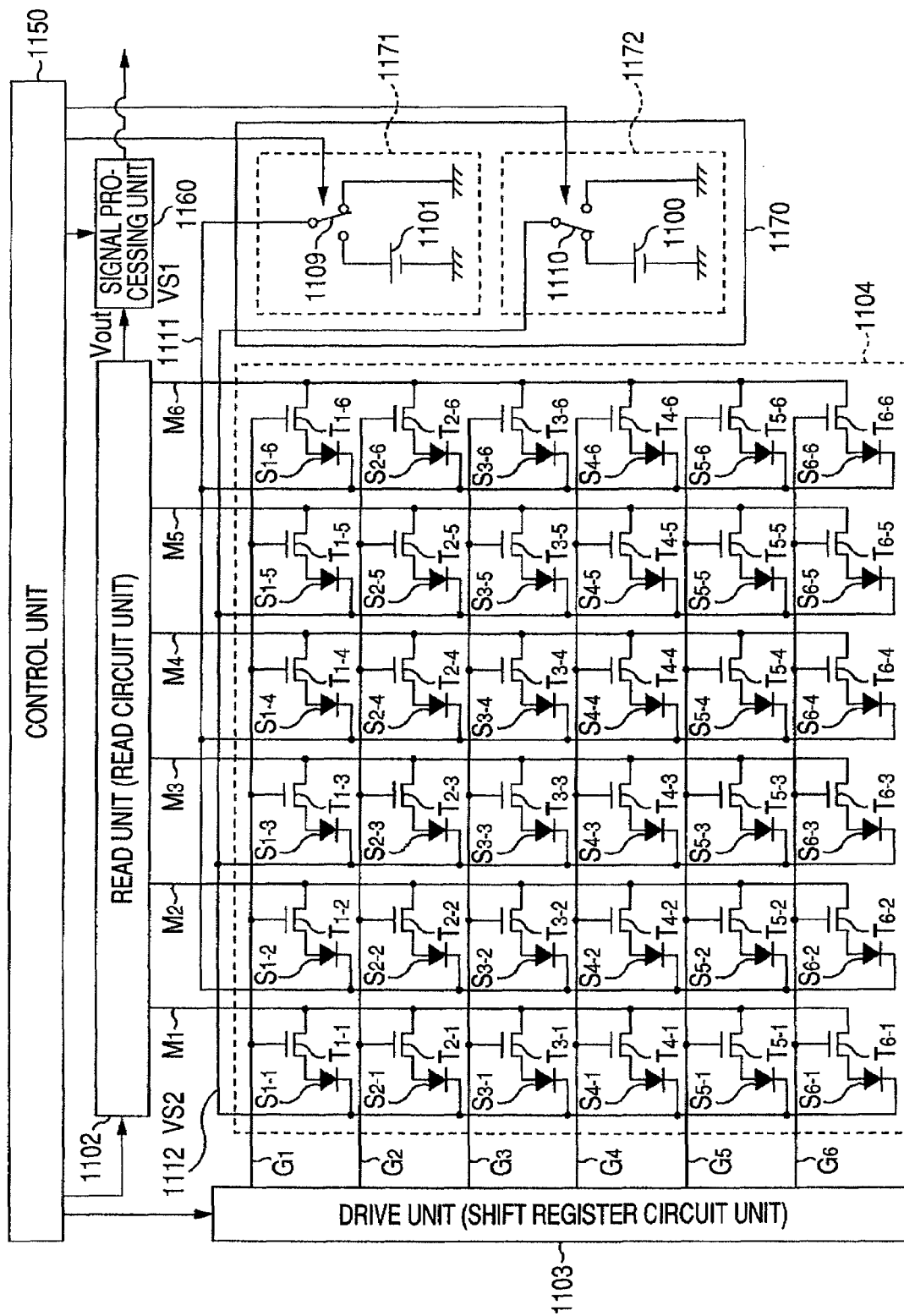
FIG. 2 is a schematic circuit diagram of the radiation imaging apparatus according to the first embodiment.

FIG. 2 is a schematic circuit diagram of the radiation imaging apparatus according to the first embodiment and illustrates a detailed example of the block diagram in FIG. 1. In FIG. 2, 36 (six times six) pixels are illustrated to simplify the description hereinafter.

The radiation detecting elements S1-1 to S6-6 convert incident radiations into electric charges. The radiation detecting element of the indirect type is formed by amorphous silicon and that of the direct type by amorphous selenium. The radiation detecting elements S1-1 to S6-6 are biased by a sensor bias supply 1501. Switch elements T1-1 to T6-6 are provided corresponding to the radiation detecting elements respectively and transfer the electric signals according to the electric charges on the corresponding radiation detecting elements to the outside. The switch elements T1-1 to T6-6 are typically formed by thin-film-transistor (TFT) using amorphous silicon.

Drive wirings G1 to G6 are wirings to drive the switch elements T1-1 to T6-6. Signal wirings M1 to M6 are wirings to read electric signals in the radiation detecting elements through the switch elements T1-1 to T6-6. The drive wirings G1 to G6 are driven by the drive unit mainly formed of a shift register circuit 1103. The signal wirings M1 to M6 are connected to the read unit 1102 to read the electric signals in the radiation detecting elements. The radiation detecting elements S1-1 to S6-6, the switch elements T1-1 to T6-6, the drive wirings G1 to G6 and the signal wirings M1 to M6 are collectively referred to as "radiation detecting unit" 1104. In other words, pixels each including one radiation detecting element and one switch element are two-dimensionally arranged in the radiation detecting unit 1104.

The radiation detecting element of the indirect type described above includes a phosphor (not shown) which converts incident radiation into light and a photoelectric conversion element which converts light converted by the phosphor into an electric charge. The photoelectric conversion element is formed of about 1-μm thick semiconductor thin film containing as a main ingredient amorphous silicon. The phosphor is arranged in such a position as to be substantially brought into contact with the photoelectric conversion element and containing as a main ingredient any one of, for example, $Gd_2O_2S$, $GD_2O_3$ and CsI.

On the other hand, the radiation detecting element of the direct type described above contains as a main ingredient any one of, for example, lead iodide, mercuric iodide, selenium, cadmium telluride, gallium arsenide, gallium phosphide, zinc sulfide and silicon. In this case, the radiation detecting element needs to be 500 μm to 1000 μm thick because it needs to absorb X rays.

The radiation detecting elements are connected to a first bias line VS1 (1111) or a second bias line VS2 (1112). In FIG. 2, the radiation detecting elements in the even columns from the left are connected to the first bias line VS1 (1111) and those in the odd columns are connected to the second bias line VS2 (1112).

The sensor bias supply unit 1170 includes a first power source unit 1171 which supplies bias to the radiation detecting elements through the first bias line VS1 and a second power source unit 1172 which supplies bias to the radiation detecting elements through the second bias line VS2. The first power source unit 1171 is provided with a first switch 1109 which changes over from a power source 1101 to GND or vice versa according to control from the control unit 1150. The radiation detecting elements in the even columns are supplied with bias voltage through the first bias line VS1 according to the changeover. The second power source unit 1172 is provided with a second switch 1110 which changes over from a power source 1100 to GND or vice versa according to control from the control unit 1150. The radiation detecting elements in the odd columns are supplied with bias voltage through the second bias line VS2 according to the changeover. The power sources 1100 and 1101 may supply the same voltage.

The power sources 1100 and 1101 supply the radiation detecting elements with bias and then the radiation detecting elements generate electric charges according to the dose of the incident radiation. This state is referred to as the "sensible state" of the radiation detecting element. The connection of the bias line to GND by the first switch 1109 or the second switch 1110 causes the radiation detecting elements not to generate electric charges even if the radiation detecting elements are radiated with radiation. This state is referred to as the "senseless state" of the radiation detecting element.

Where, in the present invention, the "sensible state" of the radiation detecting element refers to a state where an electric charge generated in the radiation detecting element according to the dose of the incident radiation can be taken out of the radiation detecting element. On the other hand, the "senseless state" of the radiation detecting element refers to a state where an electric charge generated in the radiation detecting element according to the dose of the incident radiation cannot be taken out of the radiation detecting element. In other words, the "sensible state" of the radiation detecting element refers to a state where an electric signal based on the electric charge generated in the radiation detecting element according to the dose of the incident radiation can be read by a read circuit. On the other hand, the "senseless state" of the radiation detecting element refers to a state where only an electric signal not based on an electric charge generated in the radiation detecting element according to the dose of the incident radiation can be read by a read circuit. In the first embodiment, supplying the radiation detecting element with a voltage relative to GND (a first voltage) or 0 V makes the radiation detecting element senseless state. More specifically, the electrodes of the radiation detecting element are made substantially little different in electric potential therebetween to recombine electron hole pairs generated in the radiation detecting element not to take out electric charges from the radiation detecting elements, thereby enabling reading only electric signals not based on electric charges. In the present embodiment, although a voltage relative to GND is applied across the radiation detecting elements to make the radiation detecting elements senseless state, a forward bias may be applied across the electrodes of the radiation detecting elements. In the first embodiment, a bias voltage (a second voltage) is applied across the radiation detecting elements by the power sources 1100 and 1101 to make the radiation detecting elements sensible state. More specifically, a reverse bias is applied across the electrodes of the radiation detecting elements not to recombine the electron hole pairs generated in the radiation detecting elements, thereby enabling the electric charges to be taken out from the radiation detecting elements.

In the present embodiment, as illustrated in FIG. 2, the groups of the senseless state radiation detecting elements (groups of first radiation detecting elements) are set in the even columns and the groups of the sensible state radiation detecting elements (groups of second radiation detecting elements) are set in the odd columns. That is to say, the control unit 1150 controls the changeover of the first and the second switch 1109 and 1110 to provide such a state control as to make the radiation detecting elements in the even columns senseless state and those in the odd columns sensible state in the radiation detecting unit 1104.

The read unit 1102 reads the electric signals of the radiation detecting elements S1-1 to S6-6 in the radiation detecting unit 1104 according to the drive signals from the drive unit 1103 and control from the control unit 1150. Based on the control of the control unit 1150, the signal processing unit 1160 performs a subtraction processing in which the electric signals read from the senseless state radiation detecting elements by the read circuit unit 1102 are subtracted from the electric signals read from the sensible state radiation detecting elements by the read circuit unit 1102 to generate image data.

In an example of FIG. 2, although the groups of the radiation detecting elements in the even columns are made senseless state and the groups of the radiation detecting elements in the odd columns are made sensible state, contrary to the above, the groups of the radiation detecting elements in the odd columns can be made senseless state and the groups of the radiation detecting elements in the even columns are made sensible state. In that case, the control unit 1150 throws the first switch 1109 to the position of the power source 1101 and the second switch 1110 to the position of GND. For example, if the radiation imaging apparatus is installed in a good environment where line noise is little observed, the radiation detecting elements do not always need to be made senseless state to remove line noise. In that case, the radiation detecting elements both in the odd columns and in the even columns can be made sensible state. In that case, the control unit 1150 throws the first switch 1109 to the position of the power source 1101 and the second switch 1110 to the position of the power source 1100. Thus, the use of such a configuration as to switch a bias applied across the radiation detecting elements allows providing a good image high in resolution without reduction in the number of effective pixels with all the groups of the radiation detecting elements made sensible state if the senseless state radiation detecting elements are not needed.

Figure 3:
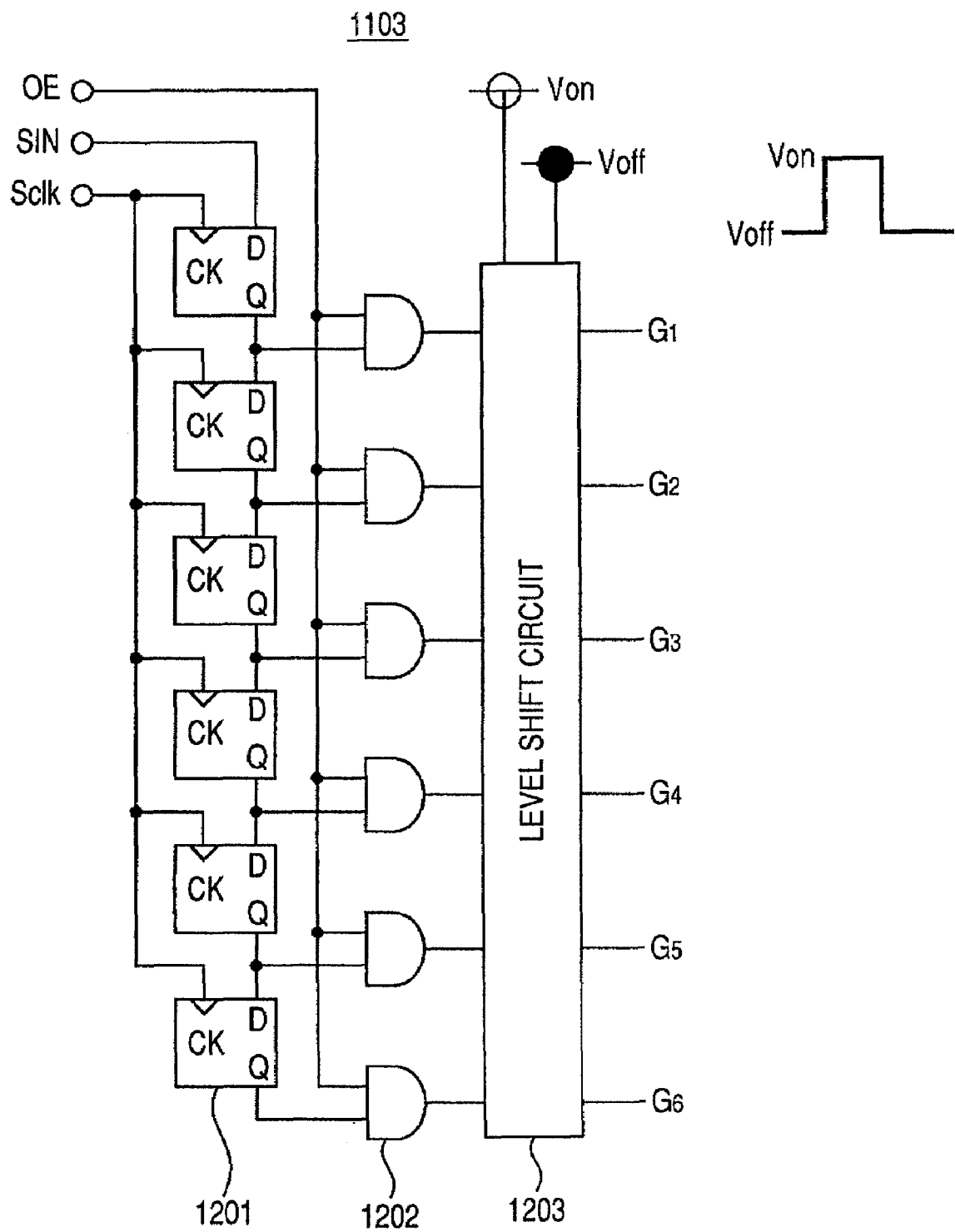
FIG. 3 is a circuit diagram illustrating an internal configuration of a drive circuit in FIG. 2.

FIG. 3 is a circuit diagram illustrating an internal configuration of the drive unit 1103 in FIG. 1 or 2. The drive unit 1103 includes a shift register circuit formed of D flip flops 1201, AND elements 1202 and level shift circuit 1203 as illustrated in FIG. 3. The drive unit 1103 is controlled by three control signals OE, SIN and Sclk. In general, the D flip flop 1201 and AND element 1202 are digital circuits, of which input and output voltages are related to a process for fabricating the above elements. In general, an input and output voltages of High logic have been 5 V system, however, nowadays a device operating at a 3.3-V or lower system appears because of recent demand for a lower power consumption and development in process technique. In general, however, the switching elements of the radiation detecting unit 1104 are containing as a main ingredient amorphous silicon, so that the drive voltage can be 5 V or higher at least in a current technique. For that reason, the level shift circuit 1203 applies a drive voltage matching with characteristic of the amorphous silicon TFT.

Figure 4:
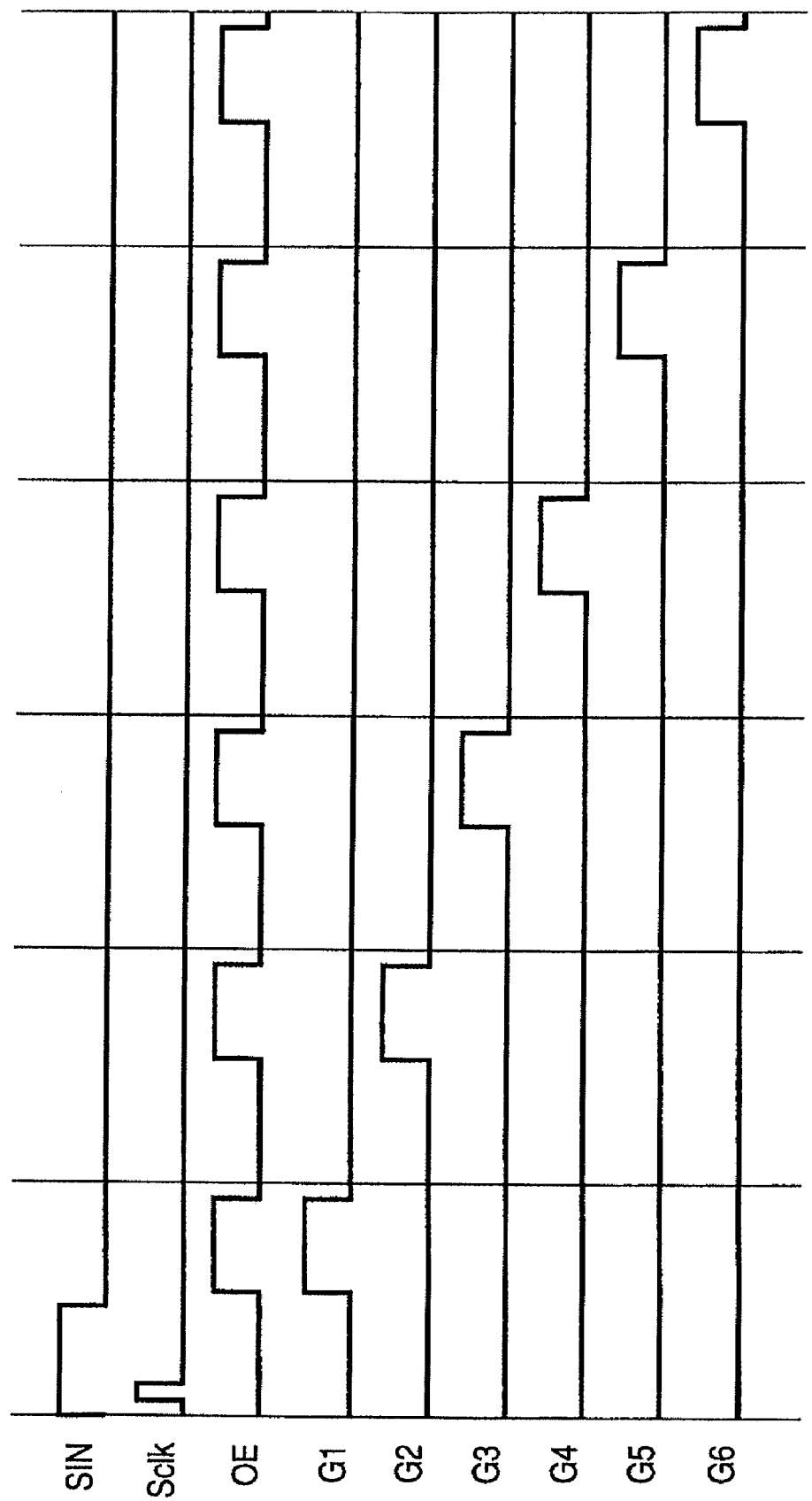
FIG. 4 is a timing chart illustrating an example of a first operation of the drive circuit (shift register circuit unit) in FIG. 3.

FIG. 4 is a timing chart illustrating an example of a first operation of the drive circuit (shift register circuit unit) 1103 in FIG. 3. In FIG. 4, drive signals each being shifted by one step are output to the drive wirings G1 to G6.

Figure 5:
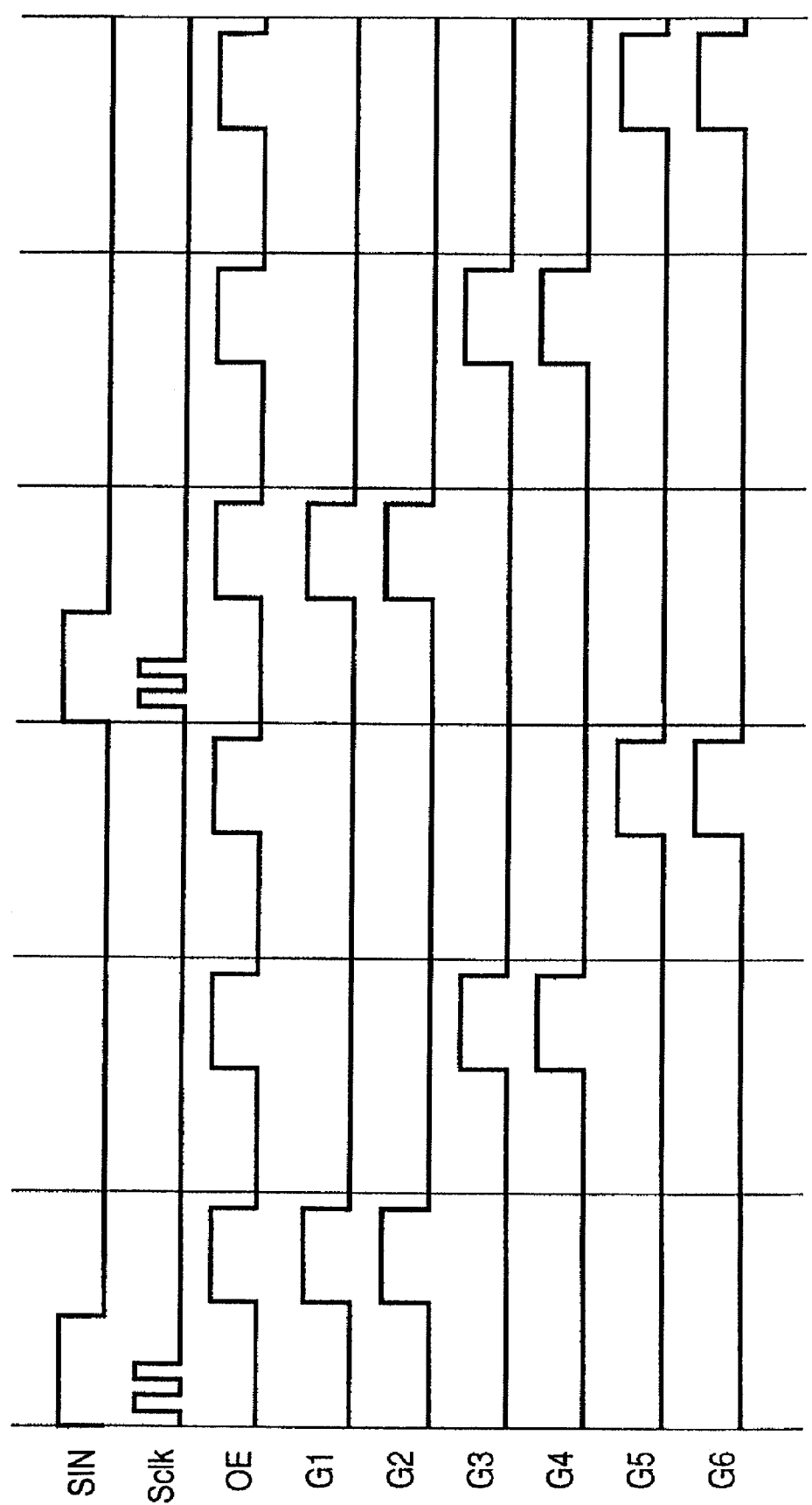
FIG. 5 is a timing chart illustrating an example of a second operation of the drive circuit (shift register circuit unit) in FIG. 3.

FIG. 5 is a timing chart illustrating an example of a second operation of the drive circuit (shift register circuit unit) 1103 in FIG. 3. In FIG. 5, drive signals are simultaneously output into the drive wirings G1 and G2, then the shift register shifts the drive signals by two steps and simultaneously outputs drive signals to the drive wirings G3 and G4, the shift register further shifts the drive signals by two steps and simultaneously outputs the drive signals to the drive wirings G5 and G6. This operation purposes to bind pixels on a line basis (the number of binding pixels n=2), at this point, the pixel pitch is twice as coarse as the above case and the drive period is halved.

Figure 6:
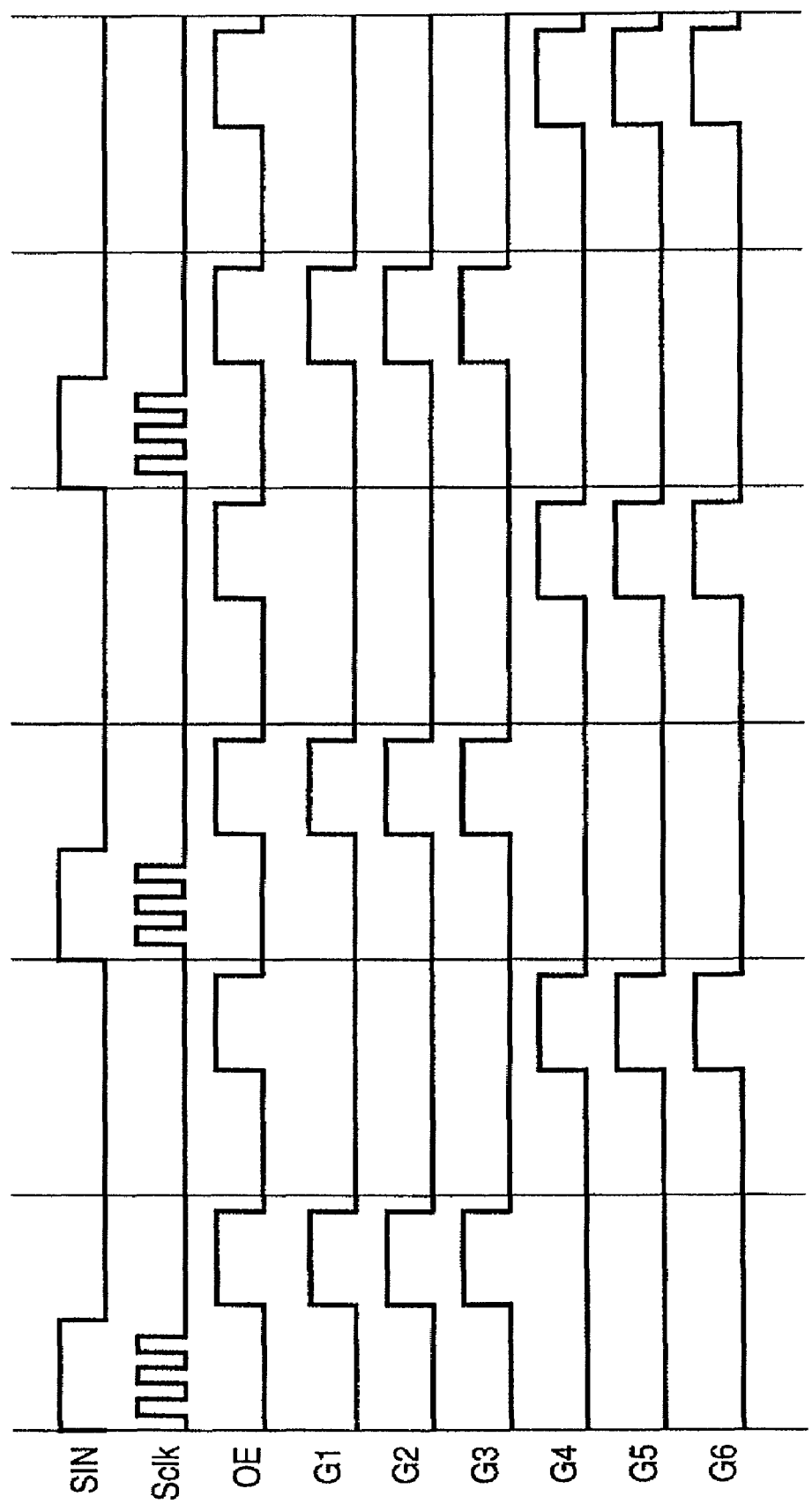
FIG. 6 is a timing chart illustrating an example of a third operation of the drive circuit (shift register circuit unit) in FIG. 3.

FIG. 6 is a timing chart illustrating an example of a third operation of the drive circuit (shift register circuit unit) 1103 in FIG. 3. In FIG. 6, drive signals are simultaneously output into the drive wirings G1, G2 and G3, then the shift register shifts the drive signals by three steps and simultaneously outputs the drive signals into the drive wirings G4, G5 and G6. This operation purposes to bind pixels on a line basis (the number of binding pixels n=3), at this point, the pixel pitch is three times as coarse as the above case and the drive period is reduced to a third.

Figure 7:
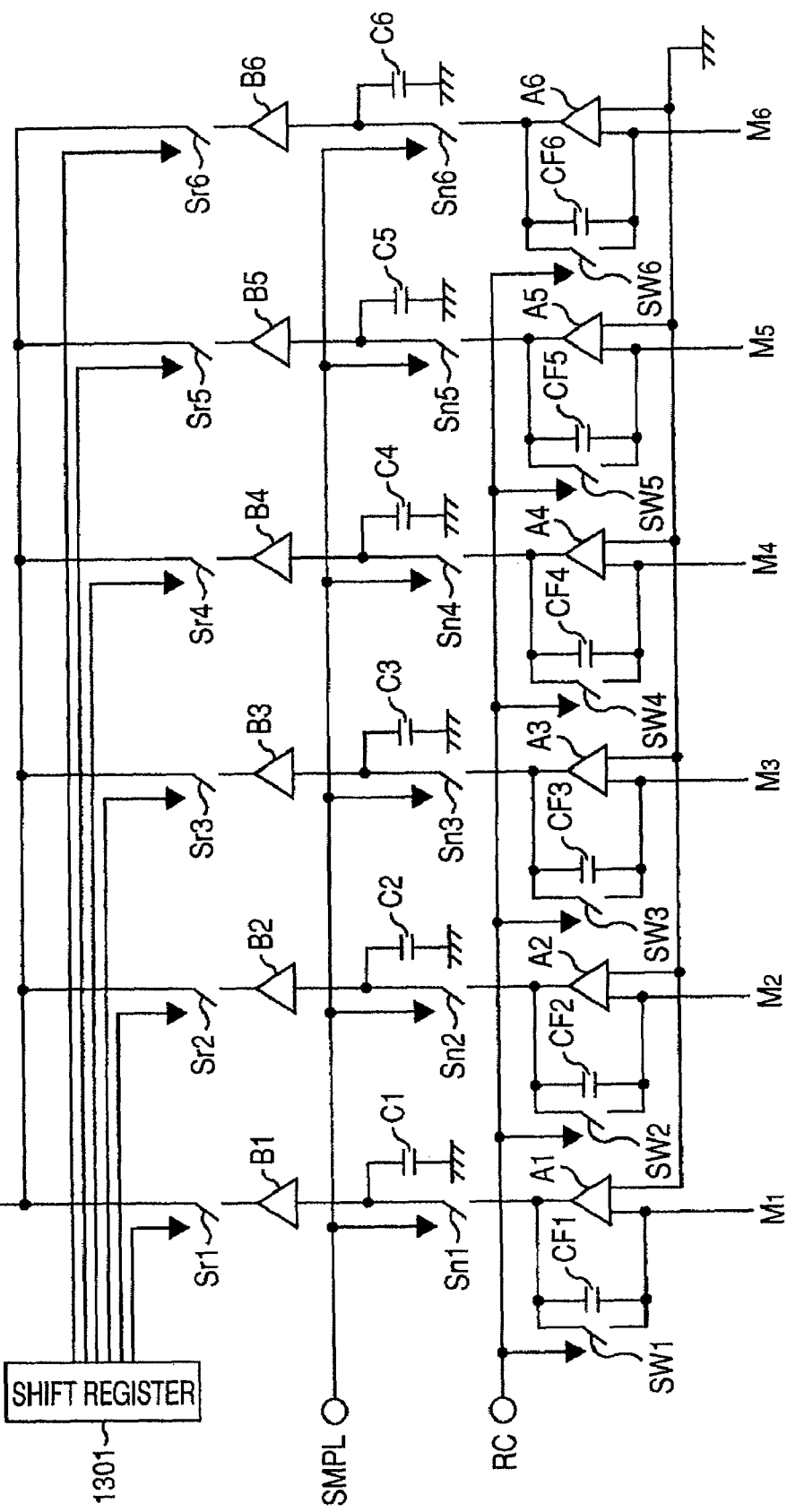
FIG. 7 is a circuit diagram illustrating an internal configuration of a reading circuit in FIG. 2.

FIG. 7 is a circuit diagram illustrating an internal configuration of the read unit 1102 in FIG. 2. Operational amplifiers A1 to A6 each functioning as an integrator include capacitive elements CF1 to CF6 respectively as illustrated in FIG. 7. Switch elements SW1 to SW6 reset integral charges of the capacitive elements CF1 to CF6 respectively by a control signal RC. The capacitive elements C1 to C6 function to sample and hold the signals of the operational amplifiers A1 to A6. Turning on switch elements Sn1 to Sn6 causes the capacitive elements to sample and hold the signals.

The switch elements Sn1 to Sn6 are turned on and off by a control signal SMPL. Buffer amplifiers B1 to B6 serve to correctly transfer the signal electric potentials of the capacitive elements C1 to C6. The control signals from a shift register 1301 are applied across switch elements Sr1 to Sr6 to transform the output of the buffer amplifiers B1 to B6 from parallel signals to series signals to be output through an amplifier 1302.

Figure 8:
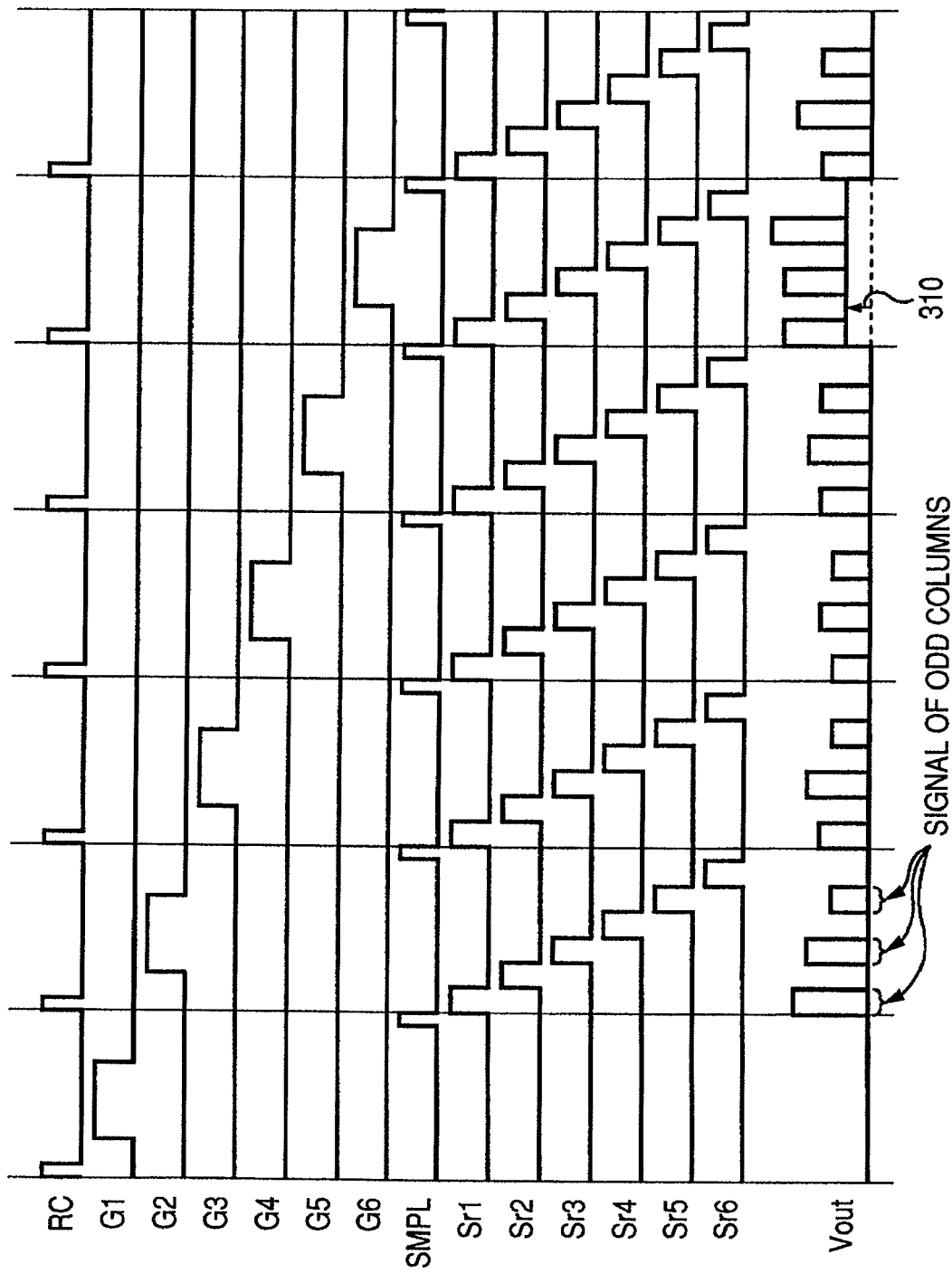
FIG. 8 is a timing chart illustrating an example of operation of the radiation imaging apparatus according to the first embodiment.

FIG. 8 is a timing chart illustrating an example of operation of the radiation imaging apparatus according to the first embodiment.

The operation on the first line is described first. The signal charges photoelectrically converted by the radiation detecting elements S1-1 to S1-6 in the first line are output to the operational amplifiers A1 to A6 via the signal wirings M1 to M6 respectively with the switch elements T1-1 to T1-6 in the first line turned on by the control signal to the drive wiring G1 (transfer operation). As a result, the respective signal charges output to the operational amplifiers A1 to A6 are stored in the capacitive elements CF1 to CF6. After that, the input of the control signal SMPL collectively transfers the stored signal charges to the capacitive elements C1 to C6 for sample and hold respectively. The sequential input of the control signal from the shift register 1301 into the switch elements Sr1 to Sr6 rearranges the signal charges in the capacitive elements C1 to C6 from parallel data to time-sequence series data to be output in the form of an analog signal for one line (series conversion operation).

In the next place, the operation on the second line is described. According to the timing chart in FIG. 8, after the signal charges in the radiation detecting elements in the first line have been sampled and held in the capacitive elements C1 to C6 by the control signal SMPL, the next transfer operation is enabled for the signal charges in the radiation detecting elements in the second line. In other words, the capacitive elements CF1 to CF6 are reset by the control signal RC, thereafter, the drive wiring G2 performs the above transfer operation, and subsequently the foregoing series conversion operation is conducted. Thus, the same operations are repeated in the third line, fourth line, . . . and n-th line. That is, in the circuit in FIG. 20, the existence of a sample-and-hold circuit enables the transfer operation in n-th line and the series conversion operation in n+1-th line to be performed simultaneously.

In FIG. 8, Vout representing the output of an analog signal from the read circuit unit 1102 is output every two pixels. This is because the analog signal is output based on the control in which the radiation detecting elements in the odd columns are made sensible state and those in the even columns are made senseless state by the control unit 1150.

In FIG. 8, a superimposed portion 310 of a so-called line noise where a certain noise quantity is superimposed on a line basis exists in the output signals (Vout) in the radiation detecting elements S5-1 to S5-6 in the fifth line. This shows a state where line noise equal in quantity is superimposed on pixels in the sensible state odd columns and pixels in the senseless state even columns. The line noise is subjected to a subtraction process in the signal processing unit 1160.

Figure 9:
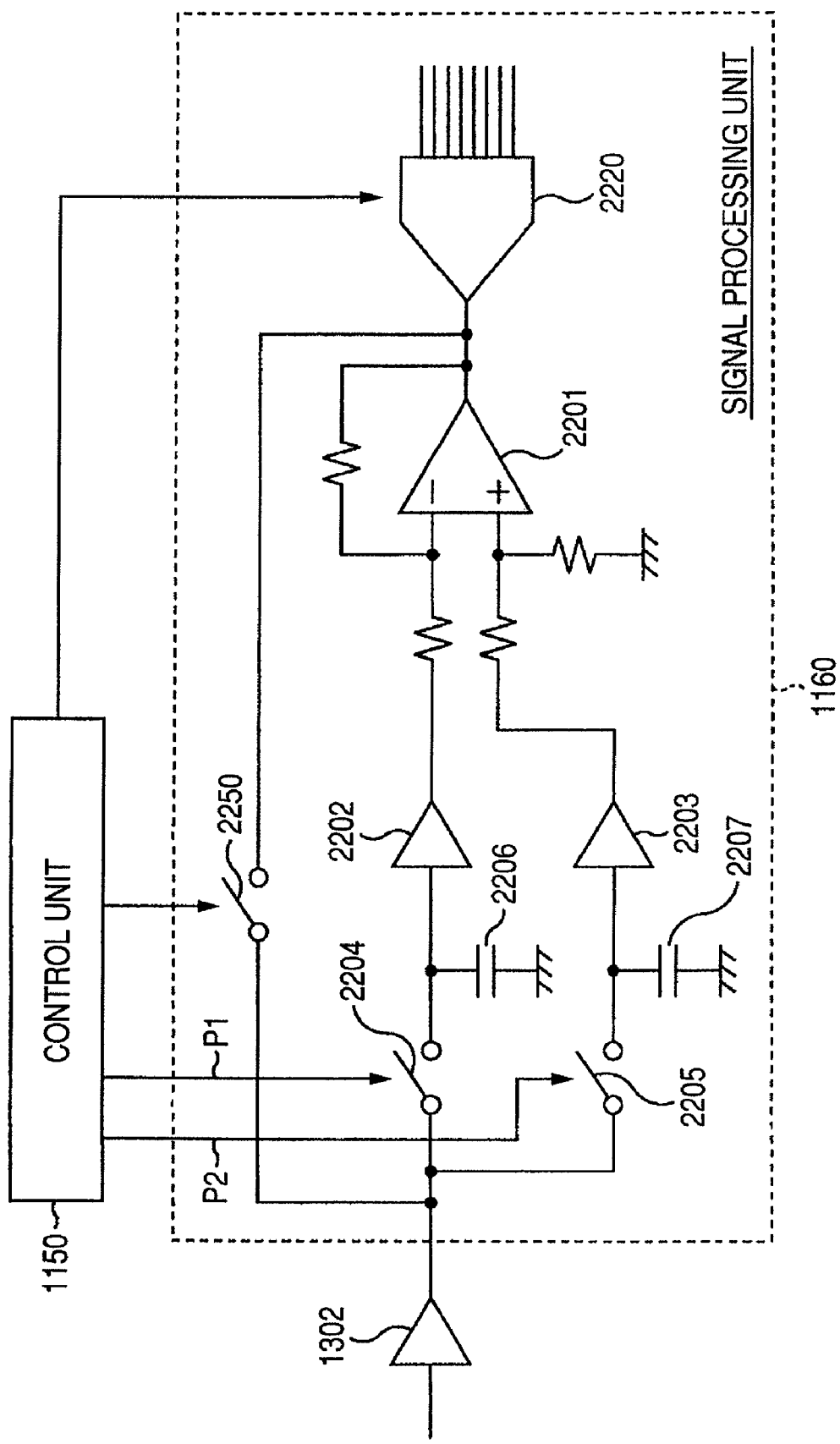
FIG. 9 is a circuit diagram illustrating an internal configuration of a signal processing circuit in FIG. 2.

FIG. 9 is a circuit diagram illustrating an internal configuration of the signal processing circuit 1160. An analog signal rearranged from parallel data to series data in the read circuit unit 1102 and output through the amplifier 1302 of the final stage is input into the signal processing circuit 1160. A switch 2204 and a capacitive element 2206 sample and hold the electric signal of the senseless state radiation detecting elements and a switch 2205 and a capacitive element 2207 sample and hold the electric signal of the sensible state radiation detecting elements. For example, as illustrated in FIG. 2, when the radiation detecting elements in the odd columns are sensible state and those in the even columns are in senseless state, the signals in the odd and the even columns are alternately input, so that the switches 2204 and 2205 are alternately turned on in synchronization therewith.

The electric signals of the sensible state radiation detecting elements sampled and held in the capacitive element 2207 and the electric signals of the senseless state radiation detecting elements sampled and held in the capacitive element 2206 are input into an amplifier 2201 through buffer amplifiers 2203 and 2202 respectively. Setting the resistance of four resistors illustrated in FIG. 9 around the amplifier 2201 to the same value allows the amplifier 2201 to function as a differential amplifier. That is to say, the differential amplifier 2201 performs a subtraction process in which the electric signals of the senseless state radiation detecting elements sent from the buffer amplifier 2202 are subtracted from the electric signals of the sensible state radiation detecting elements sent from the buffer amplifier 2203. In other words, the electric signals of the senseless state radiation detecting elements in the even columns are subtracted from the electric signals of the sensible state radiation detecting elements in the odd columns in such a manner that the electric signals of the radiation detecting elements in the second column are subtracted from those of the radiation detecting elements in the first column in the same line and also the electric signals of the radiation detecting elements in the fourth column is subtracted from those of the radiation detecting elements in the third column in the same line.

The output of the differential amplifier 2201 is input into an AD converter 2220 in which an analog signal is converted into a digital signal to form an image data. The signal processing described above enables canceling the line noise superimposed on the output signals (Vout) in the radiation detecting elements in the fifth line in FIG. 8.

As in the present embodiment, when the radiation detecting elements in the odd columns are made sensible state and the radiation detecting elements in the even columns are made senseless state, the finally obtained output signals include signals each having one signal per two pixels. For this reason, the pitch (sampling pitch) between pixels of the radiation detecting elements arranged two-dimensionally is doubled in the direction of the line. That is, for example, in the above case, pixels arranged at a pitch of 160 μm are read as those arranged at a pitch of 320 μm as far as the line direction (horizontal direction) is concerned.

A switch 2250 of the signal processing unit 1160 is a bypass switch for directly inputting an analog signal into the AD converter 2220 not through the sample-and-hold circuit and the differential amplifier 2201. For example, in FIG. 2, the radiation detecting elements do not need to be made senseless state by the control unit 1150, but all the radiation detecting elements (pixels) can be made sensible state. For example, if the radiation imaging apparatus is installed in a good environment where line noise is little observed, the senseless state radiation detecting elements do not always need to be made senseless state to remove line noise. At this point, the control unit 1150 turns on the switch 2250 to directly input the output signal from the read circuit unit 1102 into the AD converter 2220.

Although the sample-and-hold circuit and the differential amplifier are used as a circuit example of the signal processing unit 1160 in FIG. 9, other circuits may be used. For example, an analog signal may be directly input into the AD converter and stored in a memory circuit (not shown) and then a digital data may be subjected to the foregoing subtraction process on hardware or software using a computer.

Second Embodiment

Figure 10:
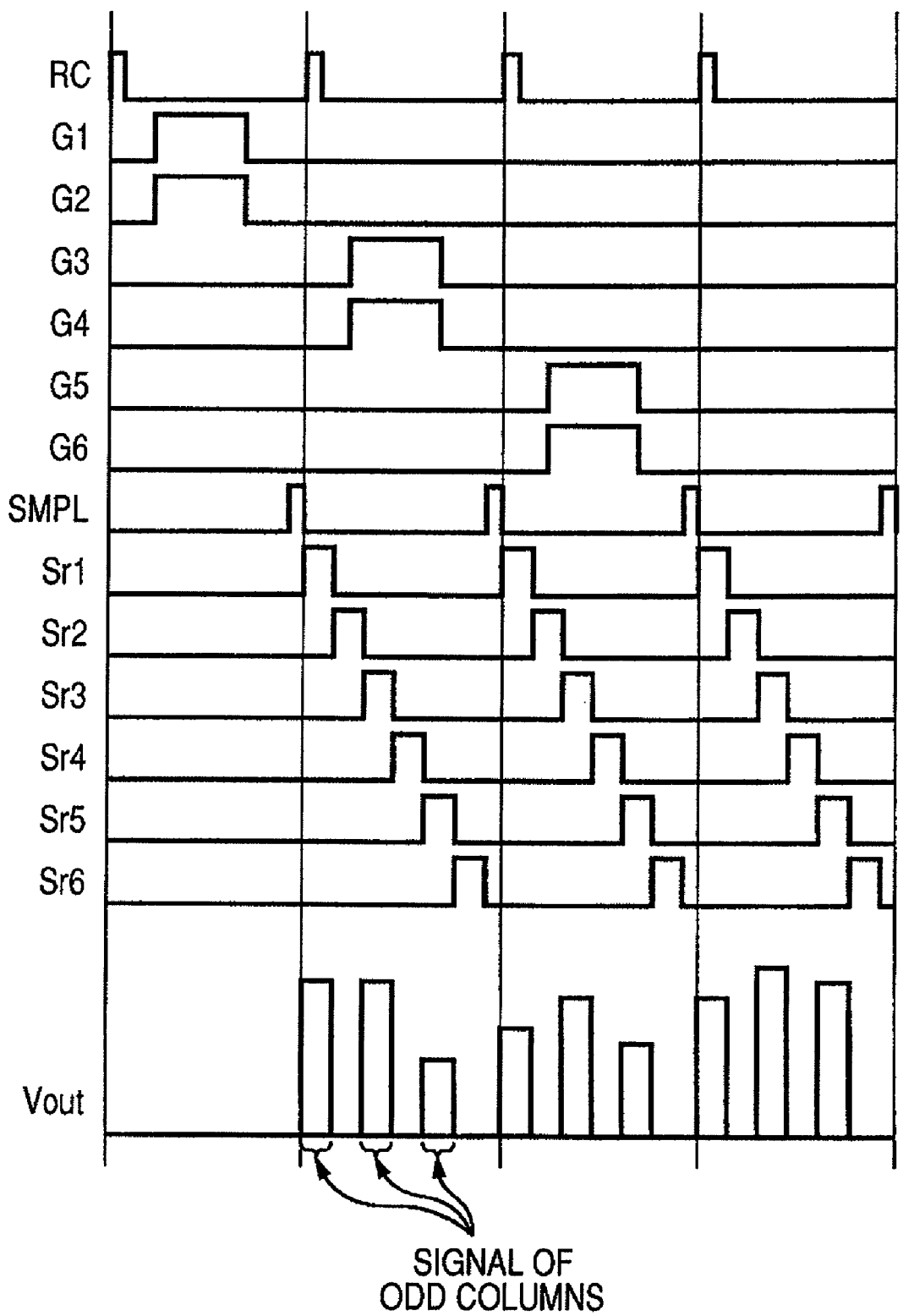
FIG. 10 is a timing chart illustrating an example of operation of the radiation imaging apparatus according to a second embodiment.

FIG. 10 is a timing chart illustrating an example of operation of the radiation imaging apparatus according to a second embodiment.

In the second embodiment, as is the case with the first embodiment, the radiation detecting elements in the odd columns are made sensible state and the radiation detecting elements in the even columns are made senseless state by the control of the control unit 1150. Thus, also in FIG. 10, Vout representing the output of the analog signal from the read circuit unit 1102 is output every other pixel or only the signals in the radiation detecting elements in the odd columns are output. As illustrated in FIG. 5, in the second embodiment, the drive circuit (shift register circuit unit) 1103 provides such a control as to simultaneously input drive signals into two drive wirings. This causes the read circuit unit 1102 to read the addition of the electric signals in the first and the second line, the addition of the electric signals in the third and the fourth line and the addition of the electric signals in the fifth and the sixth line.

The use of the signal processing circuit 1160 illustrated in FIG. 9 doubles a sampling pitch both in the line direction and in the column direction. In other words, pixels arranged at a pitch of 160 µm are read as those arranged at a pitch of 320 µm in the direction of line (horizontal direction), which means that pixels are driven at a pitch of 320 µm in the direction of column (vertical direction). For the direction of column, the electric signals of two pixels in each odd column are added and output. Repeating the timing chart in FIG. 5 provides a moving image radiographing. In this case, the read time of one frame is halved as compared with that in the timing chart illustrated in FIG. 3. This means that the frame rate of the moving image radiographing can be doubled.

Figure 11:
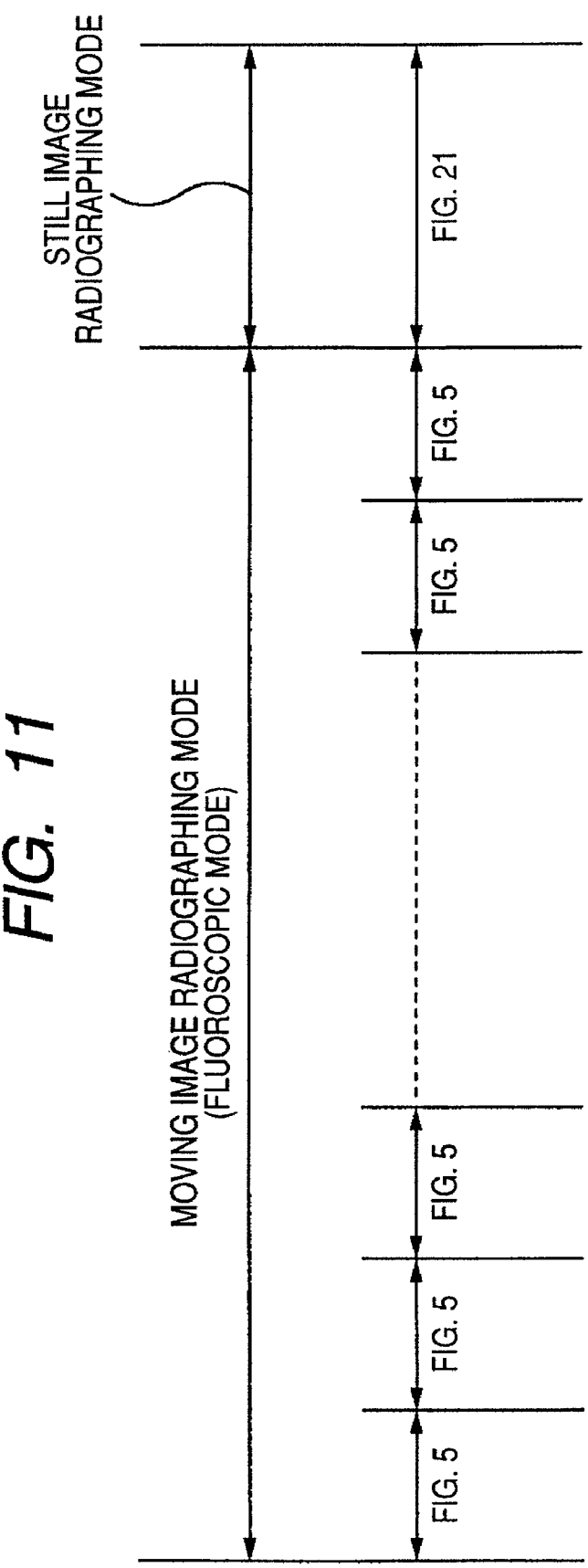
FIG. 11 is a sequence chart illustrating an example of operation of still and moving image radiographing in the radiation imaging apparatus according to the second embodiment.

An application of the second embodiment is described below. FIG. 11 is a sequence chart illustrating an example of operation of still and moving image radiographing in the radiation imaging apparatus according to the second embodiment.

In the moving image radiographing mode, when an image needs to be recorded while a read operation is being performed at a double sampling pitch in the direction of both line and column as illustrated in FIG. 10 (fluoroscopic state), the moving image radiographing mode is transferred to the still image radiographing mode and the image is read at a normal sampling pitch. For the moving image radiographing mode, the dose of incident radiation (the quantity X ray) is small, so that radiographing is performed at an increased frame rate while line noise is being reduced. For the still image radiographing mode, radiographing is performed at a high resolution.

More specifically, in the moving image radiographing mode, the control unit 1150 performs a control in which a part of the radiation detecting elements are made senseless state and the other radiation detecting elements except the part thereof are made sensible state in the radiation detecting unit 1104. Based on the control of the control unit 1150, the signal processing unit 1160 performs a subtraction processing in which the electric signals read from the senseless state radiation detecting elements by the read circuit unit 1102 are subtracted from the electric signals read from the sensible state radiation detecting elements by the read circuit unit 1102 to generate image data.

On the other hand, in the still image radiographing mode, the control unit 1150 performs a such control that all the radiation detecting elements in the radiation detecting unit 1104 are made sensible state and the above subtraction process is not performed in the signal processing unit 1160. Although FIG. 11 is a timing chart starting in the fluoroscopic mode (FIG. 10) and ended in the still image radiographing mode, modes may be repeated from the fluoroscopic mode to the still image mode, from the still image mode to the moving image mode, and from the moving image mode to the still image mode.

Third Embodiment

Figure 12:
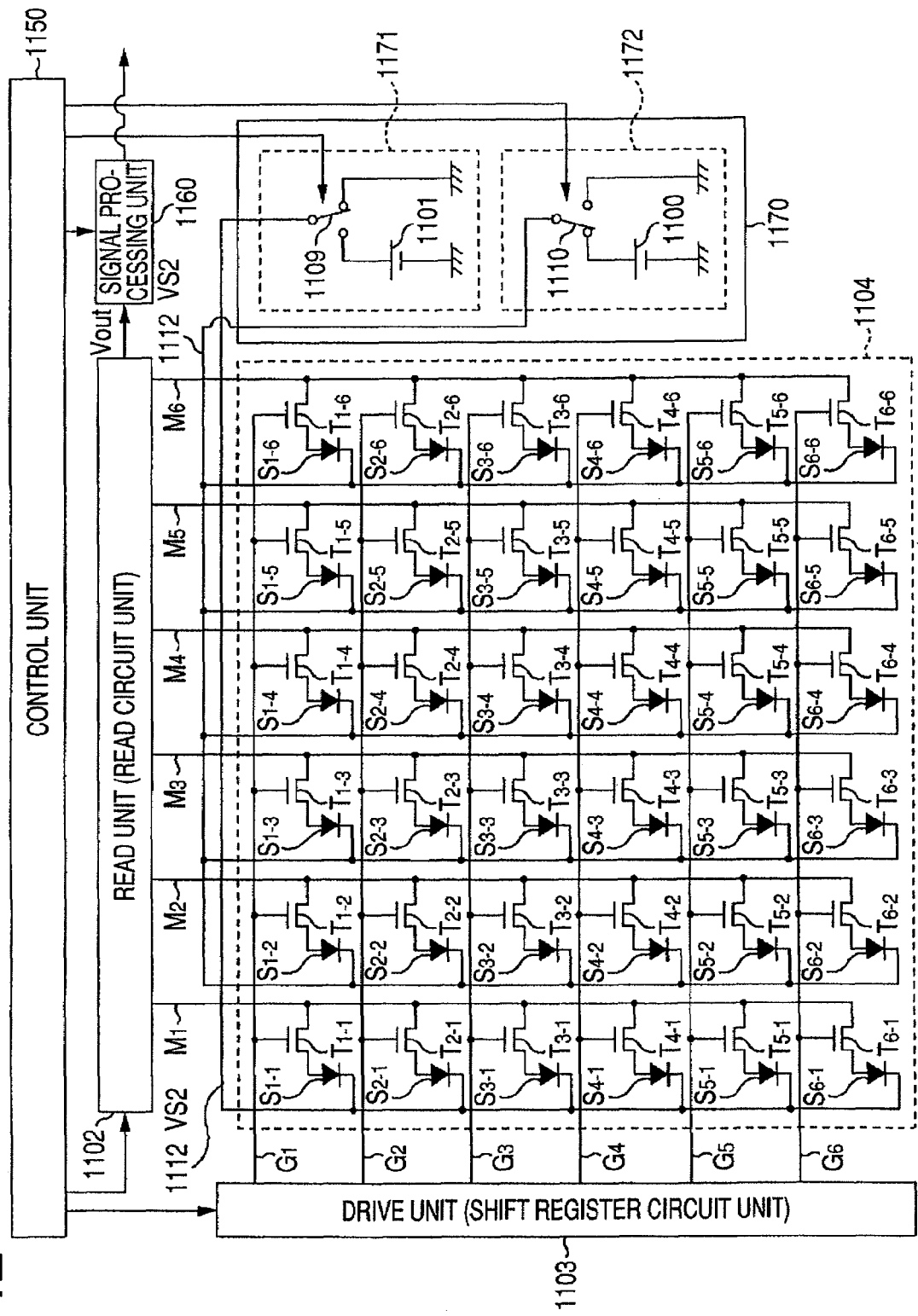
FIG. 12 is a schematic circuit diagram of a radiation imaging apparatus according to a third embodiment.

FIG. 12 is a schematic circuit diagram of a radiation imaging apparatus according to a third embodiment. In FIG. 12, the same composing elements as in FIG. 2 are given the same reference characters. In addition, 36 (six times six) pixels are illustrated to simplify the description hereinafter.

FIG. 12 is different from FIG. 2 in the connection of the bias lines VS1 and VS2 to the radiation detecting elements in the radiation detecting unit 1104. More specifically, in FIG. 12, the first bias line VS1 (1111) is connected to the radiation detecting elements S1-1 to S6-1 in the first column and the second bias line VS2 (1112) is connected to the radiation detecting elements in the second to the sixth columns. In FIG. 12, a voltage (first voltage) relative to GND is applied across the radiation detecting elements in the first column from the first power source unit 1171 and a voltage (second voltage) relative to the power source 1101 is applied across the radiation detecting elements in the second to the sixth columns from the second power source unit 1172. In other words, in the present embodiment, the control unit 1150 performs such a control that only the radiation detecting elements in the first column out of the radiation detecting elements in the radiation detecting unit 1104 are made senseless state and the radiation detecting elements in the other columns (or the second to the sixth columns) are made sensible state.

Figure 13:
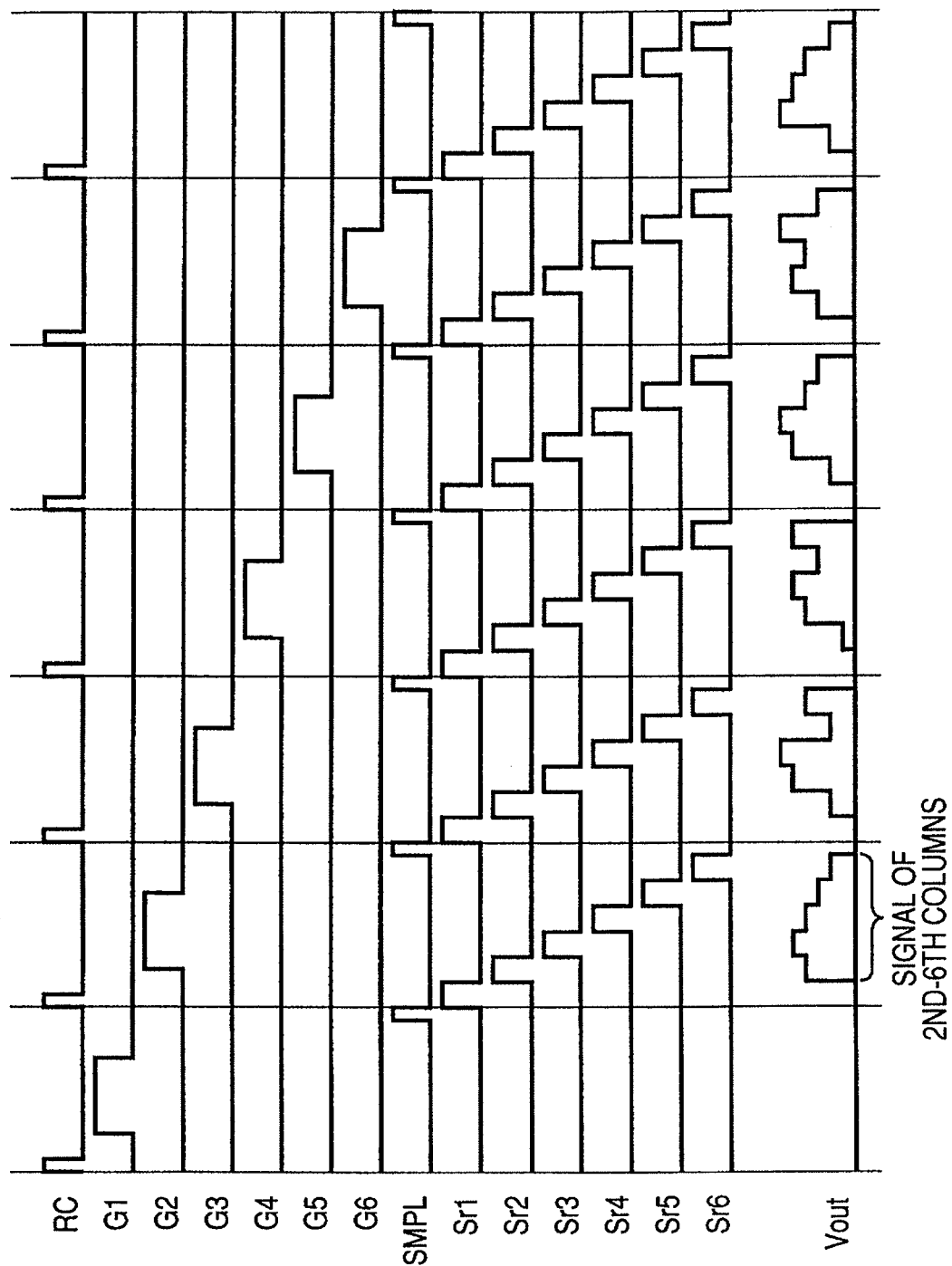
FIG. 13 is a timing chart illustrating an example of operation of the radiation imaging apparatus according to the third embodiment.

FIG. 13 is a timing chart illustrating an example of operation of the radiation imaging apparatus according to the third embodiment. As can be seen from FIG. 13, in Vout representing the output of the analog signals from the read circuit unit 1102, the output of the signals in the radiation detecting elements in the first column is nothing, and the output of the signals in the radiation detecting elements in the second to the sixth columns appear in the output for each line.

Figure 14:
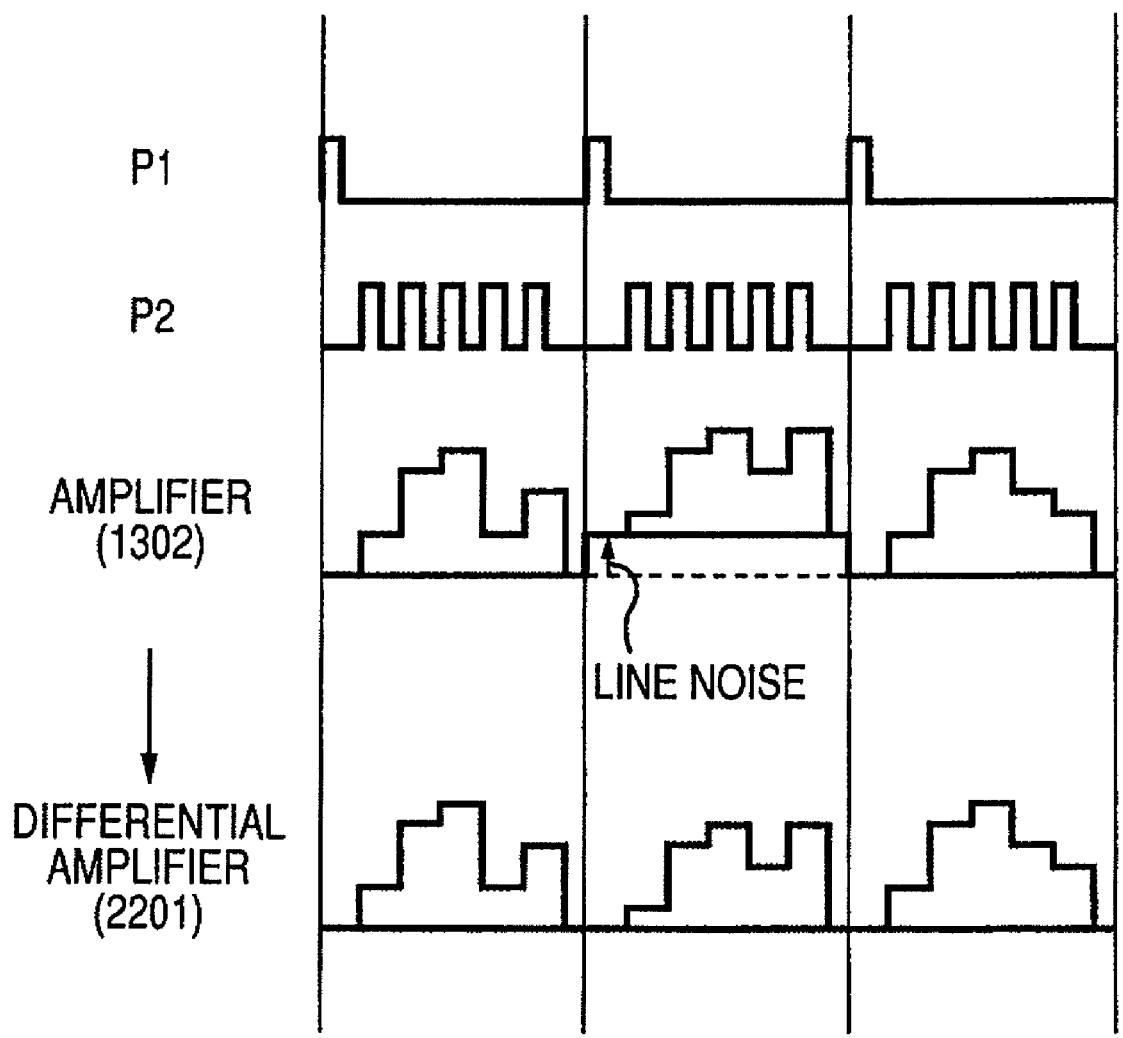
FIG. 14 is a timing chart illustrating an example of operation of a signal processing circuit according to the third embodiment.

FIG. 14 is a timing chart illustrating an example of operation of the signal processing unit 1160 according to the third embodiment. The signal processing unit 1160 related to the third embodiment is also the same in configuration as that illustrated in FIG. 9 as is the case with the first embodiment. In this case, the signals in the senseless state radiation detecting elements in the first column are read before those of the sensible state radiation detecting elements in the other columns in the series conversion operation of the read circuit unit 1102, which permits the signal processing unit 1160 to sample and hold. If not, the subtraction process at which the present invention is aimed is not executed in the signal processing unit 1160 in FIG. 9. In that case, the signals of all the radiation detecting elements may be converted from analog signals to digital signals, stored in a memory (not shown) and then data from the memory may be subjected to a desired signal processing in the signal processing unit 1160.

Then, also in the signal processing unit 1160 according to the present embodiment, the electric signals of the senseless state radiation detecting elements read by the read circuit unit 1102 are subtracted from the electric signals of the sensible state radiation detecting elements read by the read circuit unit 1102, allowing the removal of line noise illustrated in FIG. 14.

In the present invention, the output signals of the radiation detecting elements in the first column made senseless state by the control unit 1150 are not image data, and, as a result, the number of an effective pixels is reduced to 30 pixels (six lines×five columns) from 36 pixels (six lines×six columns) initially existing in the pixel area of the radiation imaging apparatus. In this case, for example, pixel signals in the second column adjacent to the first column may be used to perform an interpolation process to display 36 pixels. For a medical X ray imaging apparatus, an actual image area needs to be as large as 40 cm×40 cm to radiograph the chest of a human body, so that the radiation detecting elements may be arranged at a pixel pitch of 200 µm or less. For the radiation imaging apparatus with such a large area, when only the pixels in the end column are made senseless state, like the radiation imaging apparatus according to the present embodiment illustrated in FIG. 12, the number of columns is as many as 2000, so that the interpolation process does not always need be performed. For example, if the radiation imaging apparatus is installed in a good environment where line noise is little observed, the senseless state radiation detecting elements do not always need to be made senseless state to remove line noise. In that case, the groups of the radiation detecting elements in the first column can be also made sensible state. In addition, the control unit 1150 throws the first switch 1109 to the position of the power source 1101. Thus, the changeover of bias applied across the radiation detecting elements allows all the radiation detecting elements to be made sensible state if the senseless state radiation detecting elements are not required, which enables acquiring images excellent in resolution without decrease in the number of effective pixels.

Fourth Embodiment

Figure 15:
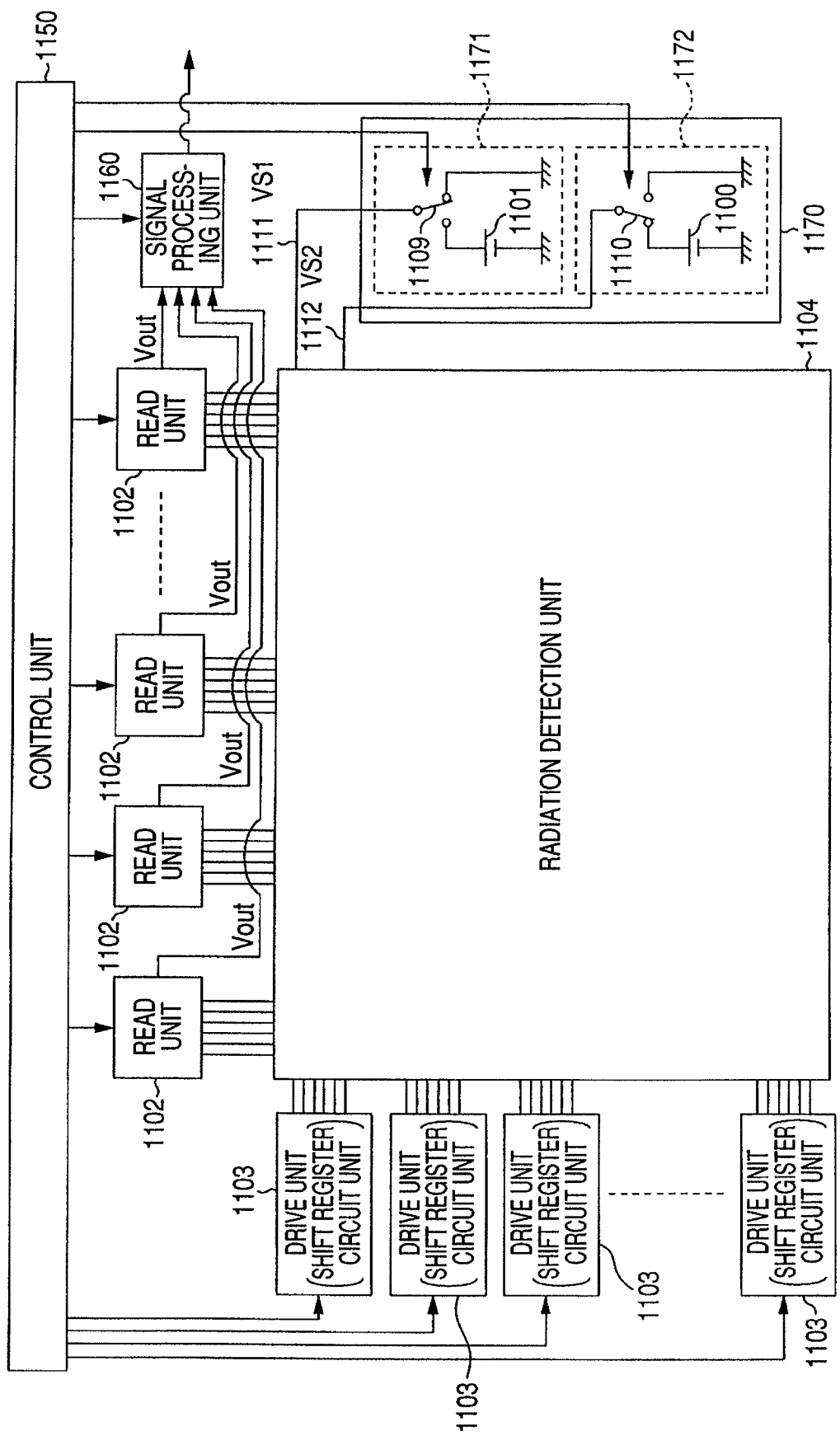
FIG. 15 is a schematic circuit diagram of the radiation imaging apparatus according to a fourth embodiment.

FIG. 15 is a schematic circuit diagram of a radiation imaging apparatus according to a fourth embodiment. As is the case with the first to the third embodiment, the radiation detecting unit 1104 includes radiation detecting elements, switch elements, drive wirings and signal wirings and functions to detect incident radiation such as X rays and convert it into an electric signal. The fourth embodiment illustrated in FIG. 15 is different from the other embodiments (for example, in FIG. 1) in that both the drive unit 1103 and the read unit 1102 are divided into plural units.

A medical X ray imaging apparatus needs the radiation detecting unit 1104 having an image area of as much as 40 cm×40 cm or more to radiograph the chest of a human body, so that it is desirable that the radiation detecting elements with a pixel pitch of 200 µm or less be two-dimensionally arranged. The radiation imaging apparatus with such a large area requires 2000 or more drive and signal wirings.

The drive unit 1103 has a shift register circuit including integrated circuits (IC) typically containing as a main ingredient crystal silicon fabricated in a semiconductor process. An individual IC is TCP modules mounted on film containing as a main ingredient polyimide and connected to the radiation detecting unit 1104 in which amorphous silicon semiconductor thin film is deposited on a glass substrate.

As is the case with the drive unit 1103, the read unit 1102 includes large scale integrated circuits (LSI) which are more sophisticated than ICs in the drive unit 1103. The LSIs are TCP modules mounted on film containing as a main ingredient polyimide. A plurality of the LSIs is connected to the radiation detecting unit 1104. In the present embodiment, the control unit 1150 may perform such a control that the senseless state and the sensible state column are set in a column area of which each read unit 1102 takes charge to perform a subtraction process. For example, as illustrated in FIG. 12, only one senseless state column may be set among a plurality of sensible state columns continuously existing. In that case, although image information related to the radiation detecting elements in the column made senseless state lacks, lacking information may be interpolated with the outputs of pixels in the adjacent sensible state columns. Specifically, the outputs of pixels in the adjacent two columns can be used as those of pixels in the adjacent sensible state columns for the interpolation process.

Various methods are conceivable how to make a radiation detecting element senseless state and sensible state. For example, in the first embodiment, the radiation detecting elements in every odd columns and in every even columns are made sensible state and senseless state respectively as schematically illustrated in FIG. 2, and in the third embodiment, the radiation detecting elements only in the end column in the plane of the radiation detecting unit 1104 are made senseless state as schematically illustrated in FIG. 12. In the latter, if line noise is superimposed without being deviated, it can be corrected in a long line with a length of, for example, 40 cm. In the former, since the pixels adjacent to the sensible state pixels are always made senseless state, line noise is equally superimposed in quantity, so that it can be accurately corrected, however, resolution is halved in the line direction. In the present embodiment, the read unit 1102 is divided into plural units. If only one column is made senseless state in respective read units, an intermediate effect is brought about between FIGS. 2 and 12. In other words, line noise can be accurately corrected without degradation in resolution in the line direction. If line noise is not observed, the radiation detecting elements do not always need to be made senseless state to remove line noise. In that case, the radiation detecting elements which have been made senseless state only in one column in each read unit can be made sensible state. In that case, the control unit 1150 throws the first switch 1109 to the position of the power source 1101. Thus, the changeover of bias applied across the radiation detecting elements allows all the radiation detecting elements to be made sensible state if the senseless state radiation detecting elements are not required, which enables acquiring images excellent in resolution without decrease in the number of effective pixels.

Fifth Embodiment

Figure 16:
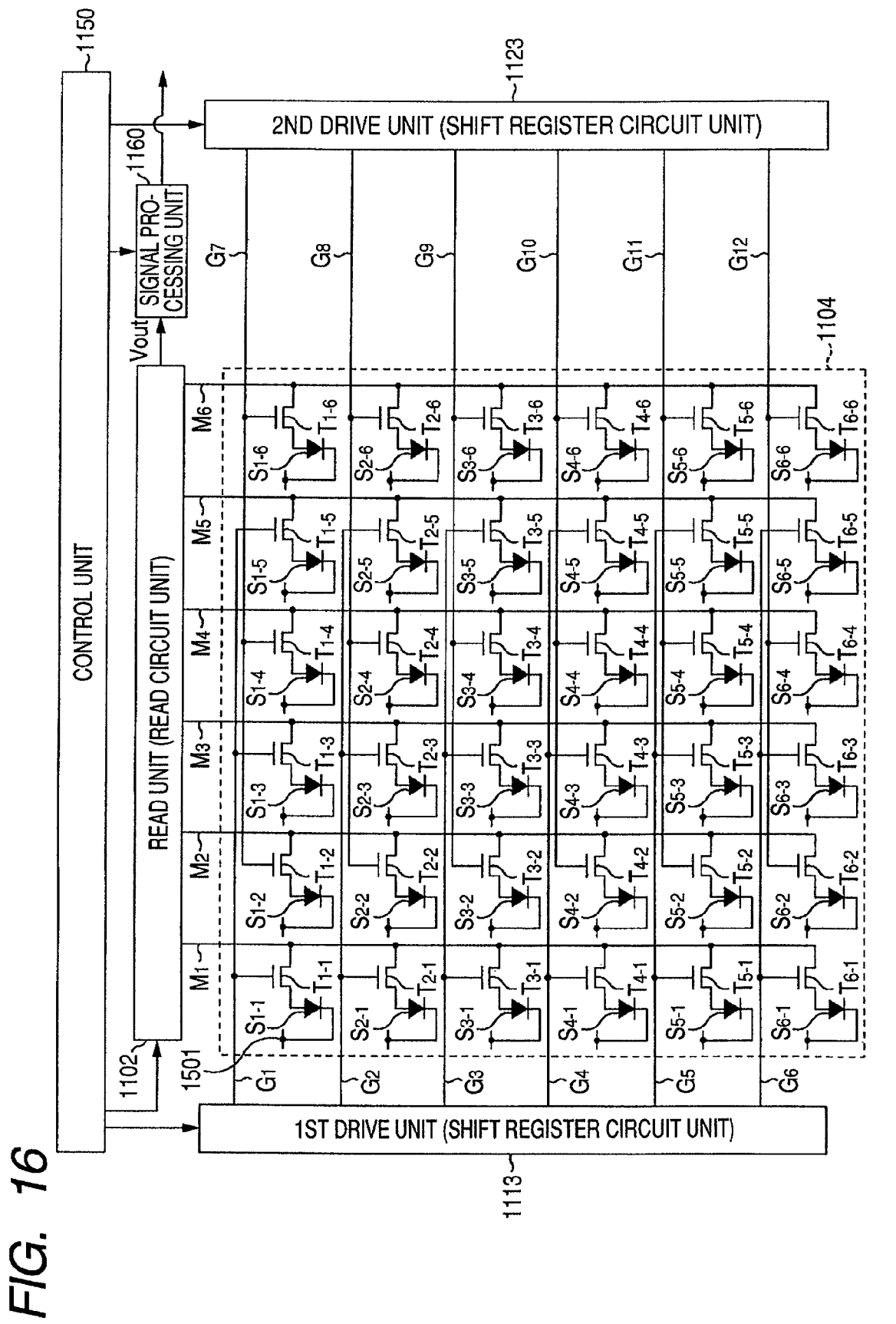
FIG. 16 is a schematic circuit diagram of a radiation imaging apparatus according to a fifth embodiment.

FIG. 16 is a schematic circuit diagram of a radiation imaging apparatus according to a fifth embodiment. In the radiation imaging apparatus of the present embodiment, the radiation detecting elements S1-1 to S6-6 of the radiation detecting unit 1104 are biased by the same sensor bias supply 1501. The radiation imaging apparatus of the present embodiment is provided with a first drive unit 1113 for driving the switches in the odd columns and a drive unit 1123 for driving the switches in the even columns as drive circuits for driving the switch elements T1-1 to T6-6.

The first drive unit 1113 drives the switches in the odd columns on a line basis according to the control of the control unit 1150 through the drive wirings G1 to G6. The second drive unit 1123 drives the switches in the even columns on a line basis according to the control of the control unit 1150 through the drive wirings G7 to G12.

Figure 17:
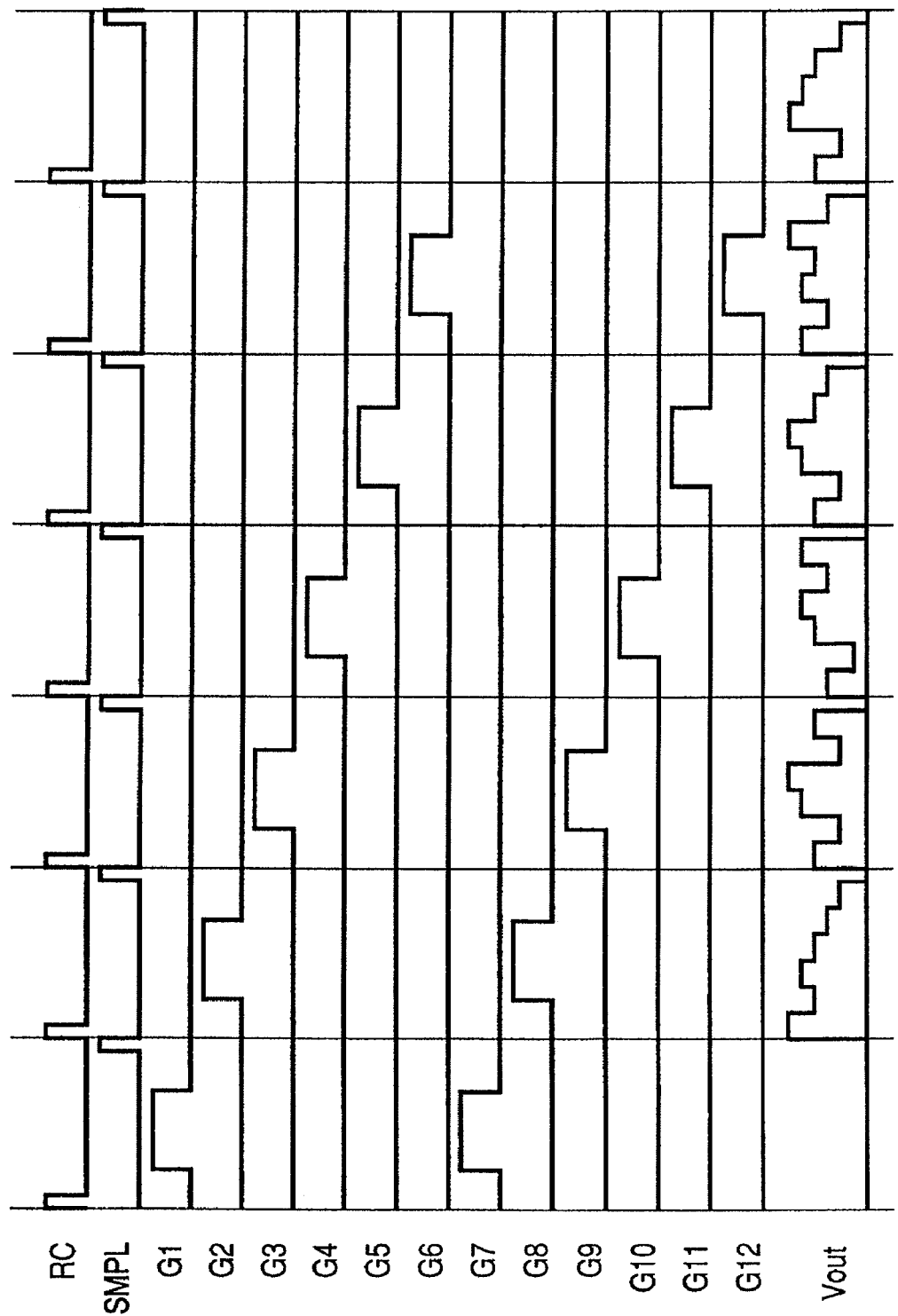
FIG. 17 is a timing chart illustrating an example of a first operation of the radiation imaging apparatus according to the fifth embodiment.

FIG. 17 is a timing chart illustrating an example of a first operation of the radiation imaging apparatus according to the fifth embodiment. FIG. 17 illustrates the timing chart in a normal reading operation for cases where the control unit 1150 does not make the radiation detecting elements senseless state in the radiation detecting unit 1104 and makes all the radiation detecting elements sensible state. This normal reading operation is conducted, for example, in a still image radiographing mode.

In the normal reading operation, as illustrated in FIG. 17, the control unit 1150 controls the first and the second drive unit 1113 and 1123 so that drive signals are simultaneously supplied to any one of pairs of drive wirings G1 and G7, G2 and G8, G3 and G9, G4 and G10, G5 and G11, and G6 and G12.

Figure 18:
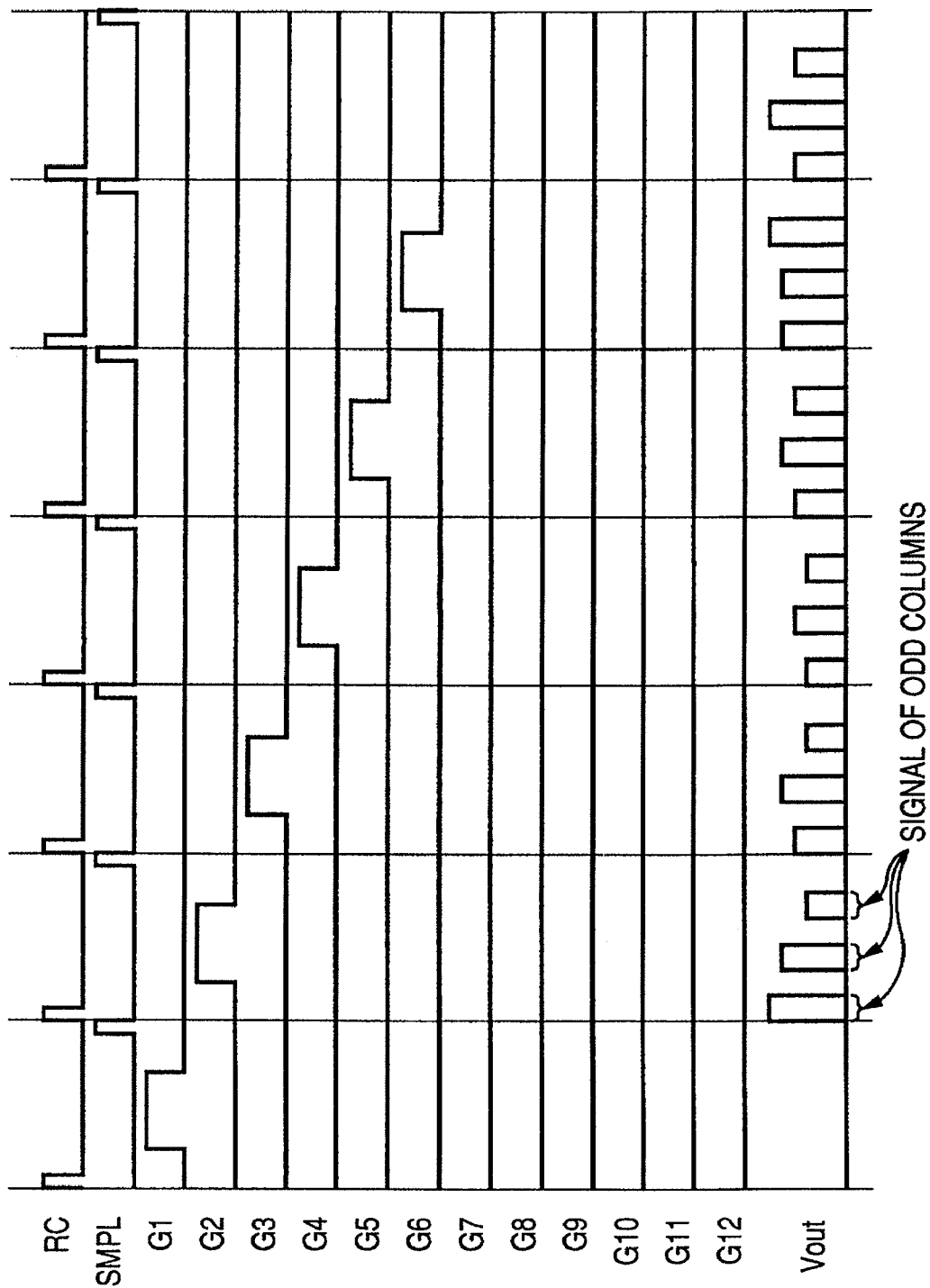
FIG. 18 is a timing chart illustrating an example of a second operation of the radiation imaging apparatus according to the fifth embodiment.

FIG. 18 is a timing chart illustrating an example of a second operation of the radiation imaging apparatus according to the fifth embodiment. FIG. 18 illustrates the timing chart in a reading operation for cases where the control unit 1150 makes the radiation detecting elements in the odd columns sensible state and the radiation detecting elements in the even columns senseless state.

More specifically, in the reading operation illustrated in FIG. 18, the control unit 1150 drives the first drive unit 1113 to cause the drive wirings G1 to G6 to supply the drive signals and prohibits the second drive unit 1123 from driving. This does not operate the switch elements provided corresponding to the radiation detecting elements in the even columns, so that the signal charges stored in the radiation detecting elements are not transferred and the electric potentials are read idly to make the radiation detecting elements senseless state. In this case, for example, the line noise is read which is superimposed when the capacitances CF1 to CF6 (not shown in FIG. 16) of the first stage amplifier of the read unit 1102 are reset.

The signal processing unit 1160 in the present embodiment also subtracts the electric signals of the senseless state radiation detecting elements in the even columns read by the read unit 1102 from the electric signals of the sensible state radiation detecting elements in the odd columns read by the read unit 1102. This enables the line noise to be removed.

In the present embodiment, the radiation detecting elements in the odd columns in the radiation detecting unit 1104 are made sensible state and the radiation detecting elements in the even columns are made senseless state. Contrary to the above, the radiation detecting elements in the odd columns can be made senseless state and the radiation detecting elements in the even columns are made sensible state. In that case, the control unit 1150 prohibits the first drive unit 1113 from driving and drives the second drive unit 1123 to cause the drive wirings G7 to G12 to supply the drive signals. The image obtained for cases where the odd columns are made sensible state and the even columns are made senseless state is halved in resolution of the column. Contrary to the above, the image obtained for cases where the even columns are made sensible state and the odd columns are made senseless state is also halved in resolution of the column. However, the latter image is read after the former has been read, doubling the read time, which, however, enabling reading without degrading resolution of the column. In addition, for example, only the radiation detecting elements in the first column among the radiation detecting elements in the radiation detecting unit 1104 can be made senseless state and the radiation detecting elements in the other columns (or, the second to the sixth column) can be sensible state. In that case, in radiation imaging apparatus illustrated in FIG. 16, only the switch elements in the sixth column are connected to the second drive unit 1123 and the switch elements in the other columns are connected to the first drive unit 1113, thereby making only the radiation detecting elements in the sixth column senseless state.

Sixth Embodiment

Figure 19:
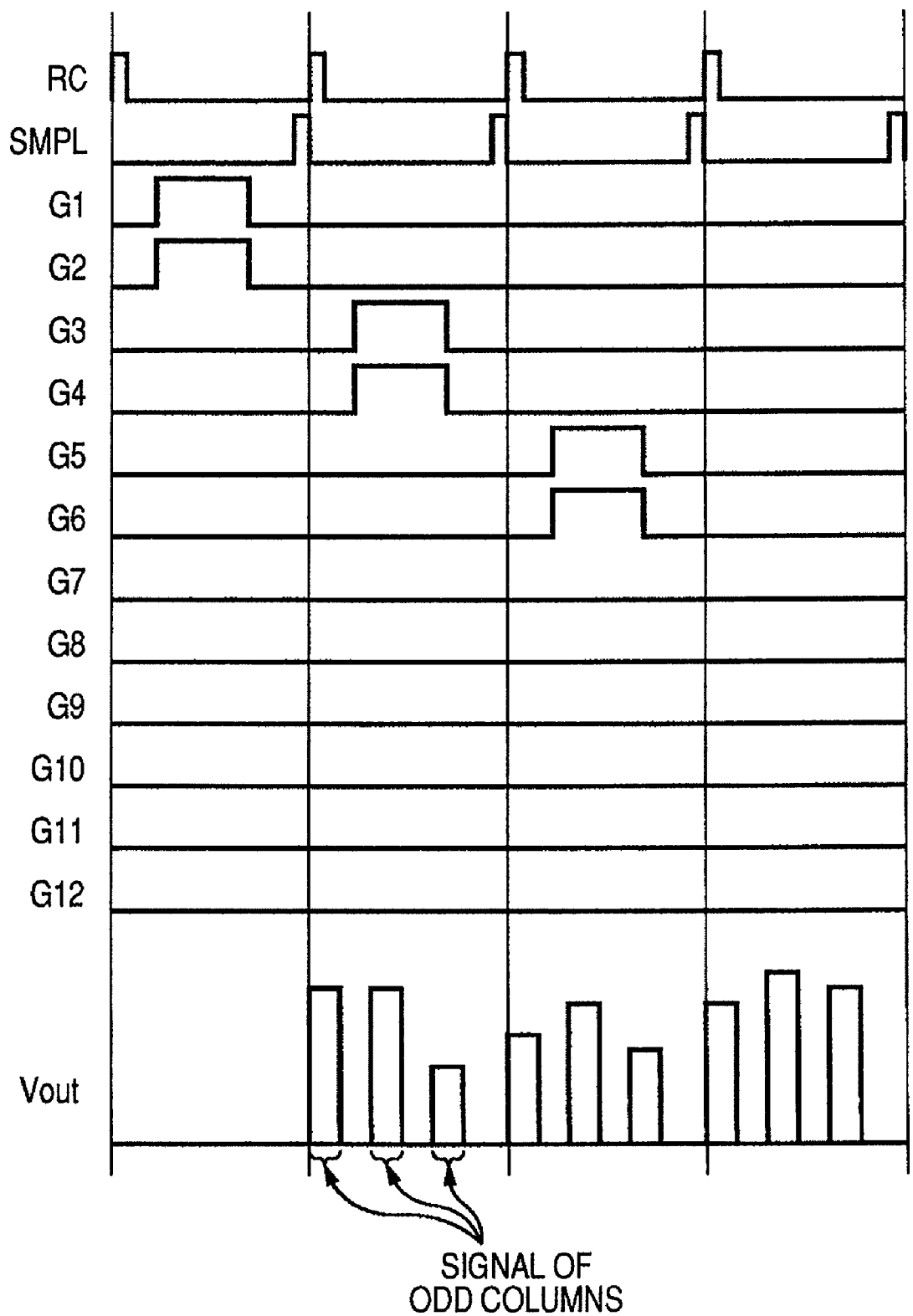
FIG. 19 is a timing chart illustrating an example of operation of the radiation imaging apparatus according to a sixth embodiment.

FIG. 19 is a timing chart illustrating an example of operation of a radiation imaging apparatus according to a sixth embodiment. The radiation imaging apparatus according to the sixth embodiment is the same in configuration as that of the fifth embodiment illustrated in FIG. 16. That is, the control unit 1150 drives the first drive unit 1113 and prohibits the second drive unit 1123 from driving to make the radiation detecting elements in the odd columns sensible state and the radiation detecting elements in the even columns senseless state respectively.

As illustrated in FIG. 19, in the sixth embodiment, the first drive unit 1113 performs such a control as to simultaneously input the drive signals into two drive wirings. This enables the read circuit unit 1102 to read the addition of the electric signals in the first and the second line, the electric signals in the third and the fourth line, and the electric signals in the fifth and the sixth line.

The signal processing unit 1160 in FIG. 9 is used to subtract the electric signals of the senseless state radiation detecting elements in the even columns read by the read unit 1102 from the electric signals of the sensible state radiation detecting elements in the odd columns read by the read unit 1102, enabling line noise to be removed.

The use of the signal processing unit 1160 in FIG. 9 doubles sampling pitch both in the line direction and in the column direction. This means that pixels arranged at a pitch of 160 μm are read at a pitch of 320 μm in the line direction (horizontal direction) and driven at a pitch of 320 μm in the column direction (vertical direction). For the column direction (vertical direction) in the odd columns, the addition of two pixels is output. The repetition of the timing chart in FIG. 19 allows a moving image radiographing. In that case, a time required for reading one frame can be halved compared with the timing chart illustrated in FIG. 18. This means that a frame rate in the moving image radiographing can be doubled. The sixth embodiment can be applied to the radiographing sequence both of a still and a moving image radiographing illustrated in FIG. 11.

Seventh Embodiment

Figure 20:
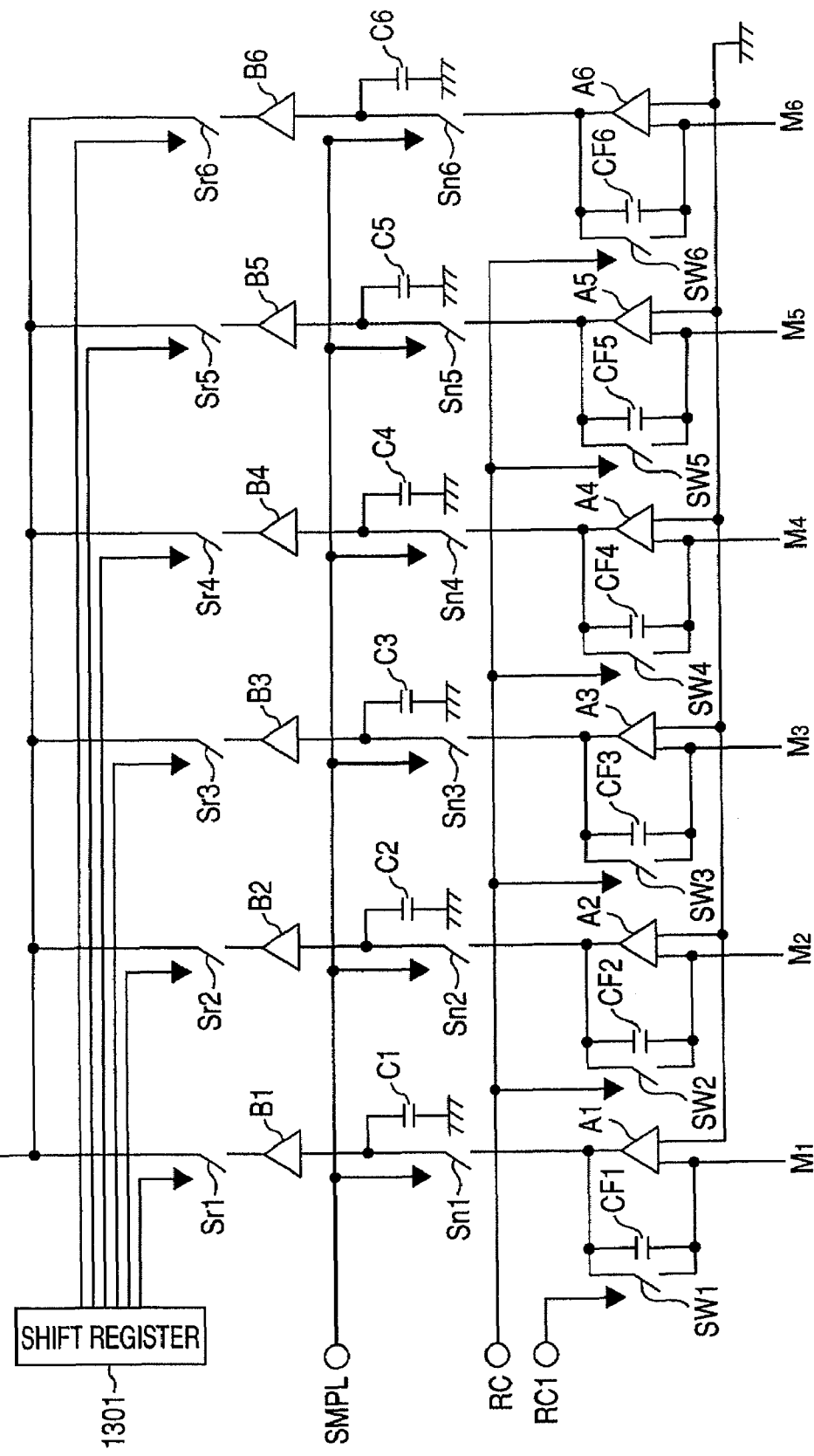
FIG. 20 is a circuit diagram illustrating an internal configuration of a reading circuit of a radiation imaging apparatus according to a seventh embodiment.

FIG. 20 is a circuit diagram of read unit of a radiation imaging apparatus according to a seventh embodiment of the present invention. The read unit in FIG. 20 is characterized in that a control signal for resetting the integral capacitances CF1 to CF6 of the operational amplifiers A1 to A6 is separated into RC and RC1. That is to say, in FIG. 20, the control signal RC1 resets the integral capacitance CF1 of the integral amplifier connected to the signal wiring M1 and the control signal RC resets the integral capacitances CF2 to CF6 of the operational amplifiers A2 to A6 connected to the signal wirings M2 to M6.

Figure 21:
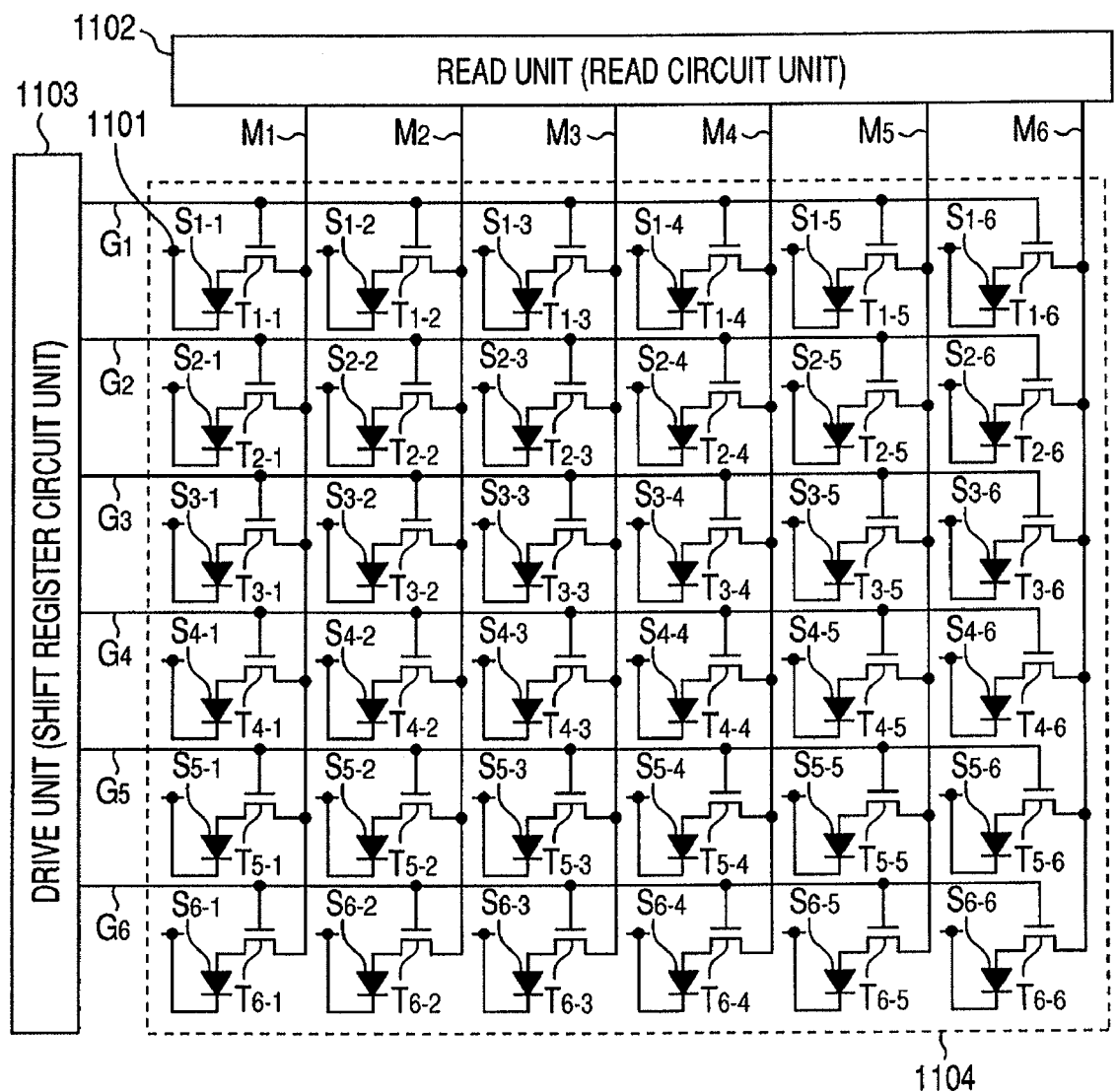
FIG. 21 is a schematic circuit diagram of the radiation imaging apparatus according to the seventh embodiment.

FIG. 21 is an example of a radiation detecting unit connected to the read unit. FIG. 21 is different from FIGS. 2 and 12 in that the bias line for biasing the radiation detecting elements is not separated into plural systems. However, a radiation detecting unit connected in the present embodiment may use the radiation detecting unit in FIGS. 2 and 12 provided that the electric potentials of the bias lines are set to be equal to each other in each system. The present embodiment is characterized in that the control lines RC and RC1 of the read unit are separately provided to cause the read unit to form radiation detecting pixels corresponding to the senseless state region.

Figure 22:
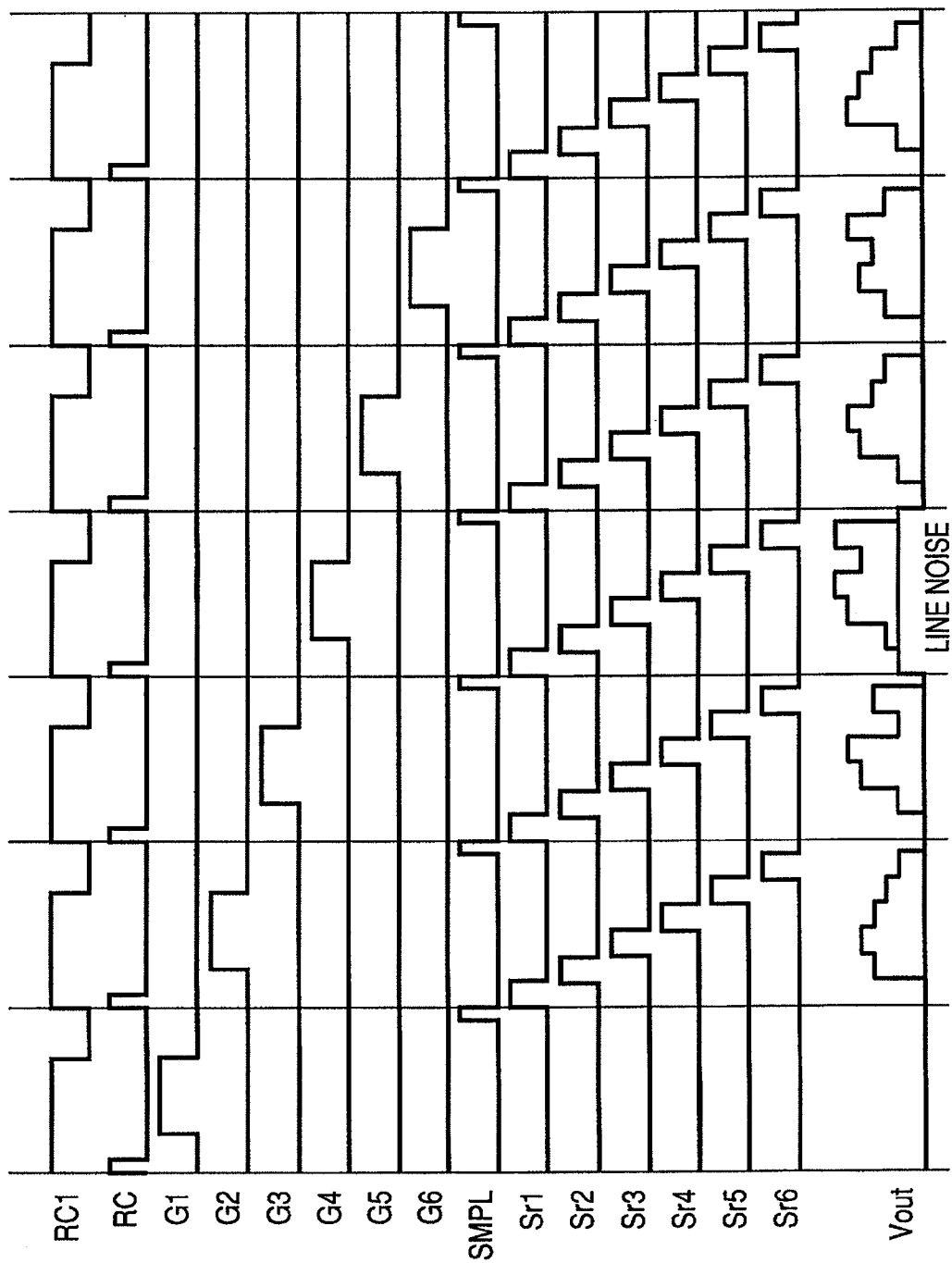
FIG. 22 is a timing chart of the radiation imaging apparatus according to the seventh embodiment.
Figure 23:
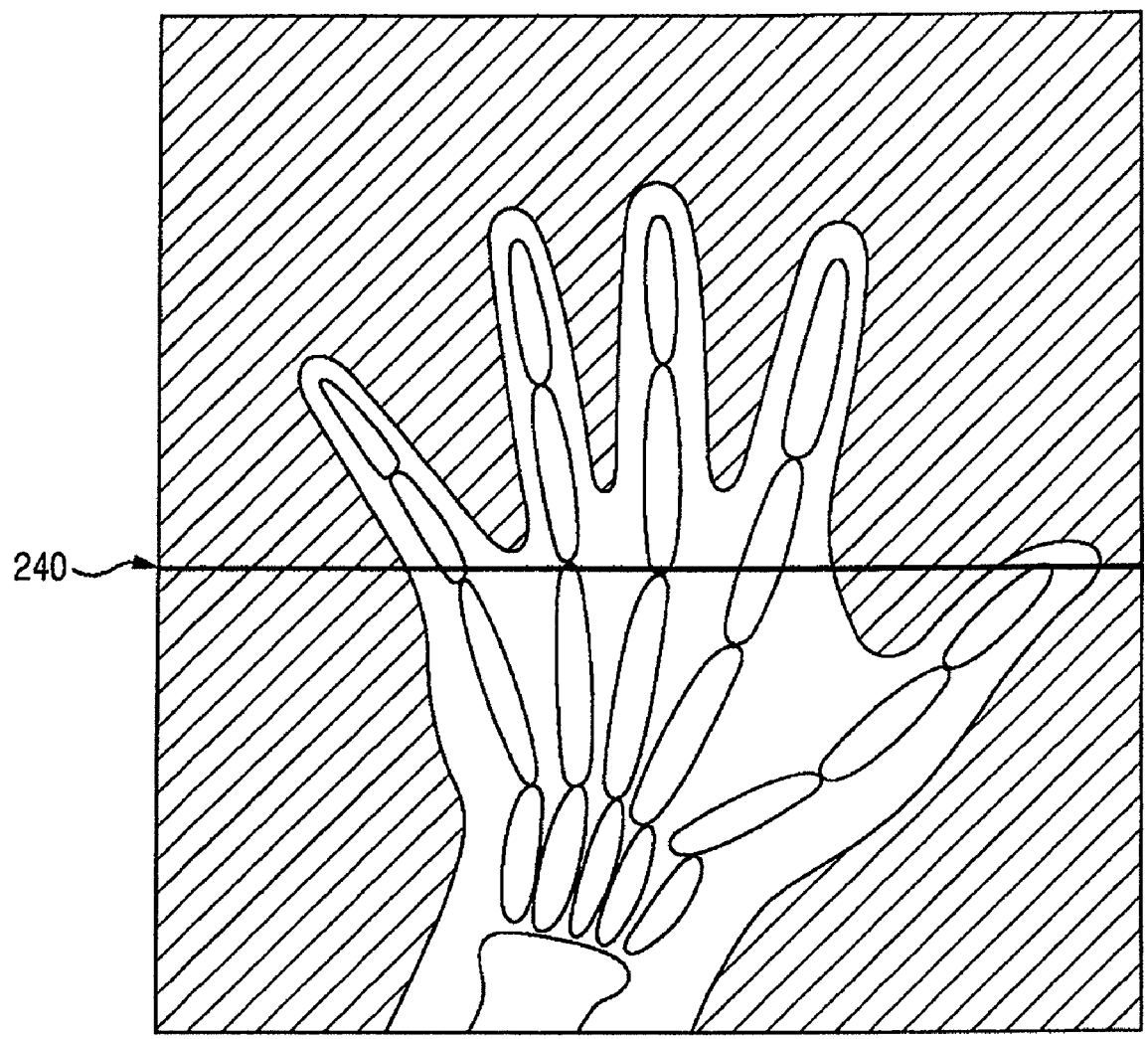
FIG. 23 is an example of an image on which line noise is superimposed.

The present embodiment enables the signal wiring M1 corresponding to RC1 to be set at the senseless state region of the column. FIG. 22 is a timing chart illustrating the operation in FIG. 20. RC1 is turned on with RC1 superimposed on the drive signals provided for the drive wirings G1 to G6 which turn on TFTS. This allows the signal charges in the radiation detecting elements corresponding to the column of the signal wiring M1 not to be integrated by the integral capacitances CF1 but to be made senseless state.

Turning on the control signal SMPL for sample-and-hold after the control signal RC1 has been turned on causes the electric charges of CF1 to CF6 to be sampled and held in the sample-and-hold capacitors C1 to C6. At this point, as illustrated as Vout in FIG. 22, line noises getting into the signal wirings M1 to M6 and the output terminals of the operational amplifiers A1 to A6 through the power source line, GND line and space are sampled and held in synchronization with the sample-and-hold signal. These noises are separately subtracted and compensated by, for example, the processing circuit illustrated in FIG. 9.

Incidentally, in the present embodiment, the control line of the operational amplifier corresponding to the signal wiring M1 is taken to be a separate system in the above description, however it may be separated into an odd and an even system in configuration.

In the timing chart in FIG. 22, while the control signal RC1 is so controlled as to be completely superimposed on the drive signals which turn on the TFTs, it does not need to be completely superimposed if the above control aims to operate as senseless state region or to superimpose line noise.

In the embodiments according to the present invention, as stated above, the senseless state of the radiation detecting elements means a state where electric signals cannot be taken out of the radiation detecting elements, in other words, it also means a state where only line noise can be detected. In addition, as stated above, the sensible state of the radiation detecting elements means a state where electric signals can be taken out of the radiation detecting elements, in other words, it also means a state where line noise may be included in the electric signals of the radiation detecting elements.

The radiation imaging system can be provided as other embodiments according to the present invention. For example, the radiation imaging system includes a system which has any of the radiation imaging apparatus of the first to sixth embodiments and a radiation source which emits radiation to the radiation imaging apparatus through an object. This radiation imaging system also enables achieving the above effect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-066089, filed Mar. 10, 2006, and Japanese Patent Application No. 2007-008140, filed Jan. 17, 2007, which are hereby incorporated by reference herein in their entirety.

What is claimed is:

1. A radiation imaging apparatus comprising:
   a plurality of pixels arranged two-dimensionally, each pixel including a radiation detecting element converting incident radiation into electric charge;
   a control unit for performing a state control to switch the radiation detecting element in a predetermined at least one pixel of the plurality of pixels into a senseless state and make the radiation detecting element in a second pixel of the plurality of pixels assume a sensible state, wherein an electric charge generated according to incident radiation cannot be taken out of the radiation detecting element in said senseless state in the predetermined pixel and an electric charge generated according to incident radiation can be taken out of the radiation detecting element in said sensible state, and to make the radiation detecting element in the other pixel sensible state wherein an electric charge generated according to incident radiation can be taken out of the radiation detecting element in the other pixel, wherein the control unit can control to make the radiation detecting element in the predetermined pixel sensible state;
   a signal processing unit including a reading circuit for reading out in parallel a first electric signal based on the pixel that is in the sensible state and a second electric signal from not based on the charge according to the pixel that is in the senseless state, wherein the second electric signal is not based on electric charge generated by incident radiation; and
   said signal processing unit further configured to perform a subtraction, in which the second electrical signal is subtracted from the first electric signal.

2. The radiation imaging apparatus according to claim 1, further comprising a voltage supply unit supplying a first voltage for setting the radiation detecting element in the senseless state and a second voltage for setting the radiation detecting element in the sensible state, wherein the control unit controls the voltage supply unit so as to supply the first voltage to the radiation detecting element in the predetermined at least one pixel and to supply the second voltage to the radiation detecting element in the other second pixel.

3. The radiation imaging apparatus according to claim 2, wherein the voltage supply unit is provided with a first power source unit connected to the radiation detecting element in the predetermined at least one pixel and a second power source unit connected to the radiation detecting element in the other second pixel and the first and the second power source units are provided with their respective switching units for switching between the first and the second voltages, and
   the control unit controls the voltage supply unit such that the switching unit of the first power source unit is thrown to the position of the first voltage and the switching unit of the second power source unit is thrown to the position of the second voltage.

4. The radiation imaging apparatus according to claim 1, wherein the predetermined at least one pixel is arranged in an odd column of the plurality of pixels, and the second pixel is arranged in an even column of the plurality of pixels.

5. The radiation imaging apparatus according to claim 1, wherein the predetermined at least one pixel is arranged in a predetermined one column of the plurality of pixels.

6. The radiation imaging apparatus according to claim 1, wherein each of the pixels is provided with a switch element for transferring the first electric signal corresponding to each of the radiation detecting elements, and
   the radiation imaging apparatus further comprises a drive circuit which drives the switch elements.

7. The radiation imaging apparatus according to claim 6, wherein the drive circuit is connected to a plurality of drive wirings connecting the switch elements in the line direction and simultaneously drives the switch elements in a plurality of lines through the drive wirings to read the addition of the electric signals of a plurality of the radiation detecting elements on a column basis.

8. The radiation imaging apparatus according to claim 6, wherein
the drive circuit comprises a first drive circuit which drives the switch elements of the predetermined at least one pixel and a second drive circuit which drives the switch elements of the other second pixel, and
the control unit sets the predetermined at least one pixel into the senseless state and sets the other second pixel into the sensible state, by prohibiting driving of the first drive circuit and by permitting driving of the second drive circuit.

9. The radiation imaging apparatus according to claim 1, wherein the control unit sets the predetermined at least one pixel into the senseless state and sets the other second pixel into the sensible state according to a control signal provided to the read-out circuit.

10. The radiation imaging apparatus according to claim 1, wherein the radiation detecting element comprises a phosphor converting the incident radiation into light and a photoelectric conversion element converting the light converted by the phosphor into the electric charge.

11. The radiation imaging apparatus according to claim 10, wherein the photoelectric conversion element contains as a main ingredient amorphous silicon.

12. The radiation imaging apparatus according to claim 1, wherein, in a moving image radiographing mode, the control unit switches the at least one pixel between the first senseless and second the sensible states, and the signal processing unit performs the subtraction processing,
and in a still image radiographing mode, the control unit switches all of the radiation detecting elements into the sensible state, and the signal processing unit does not perform the subtraction processing.

13. A radiation imaging system comprising:
the radiation imaging apparatus according to claim 1; and
a radiation source irradiating the radiation imaging apparatus with radiation.

* * * * *